US006314851B1

(12) United States Patent
Graves et al.

(10) Patent No.: US 6,314,851 B1
**(45) Date of Patent: *Nov. 13, 2001**

(54) DUAL MINI-BLIND CUTTER

(75) Inventors: Delbart B. Graves, Nora; Carl Pahnke; James L. Daniels, both of Freeport; David J. Jarecki, Rockford, all of IL (US); Michael J. Walsh, Elm Grove, WI (US); Roger L. Anderson, McConnell, IL (US)

(73) Assignee: Newell Operating Company, Freeport, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/321,674

(22) Filed: May 31, 1999

Related U.S. Application Data

(63) Continuation-in-part of application No. 08/900,987, filed on Jul. 25, 1997, now abandoned.

(51) Int. Cl.[7] .................................................... B23D 23/00

(52) U.S. Cl. .......................... 83/553; 29/24.5; 83/699.31; 83/699.51; 83/633

(58) Field of Search ............................ 83/699.31, 699.41, 83/699.51, 699.61, 553, 562, 563, 196, 197, 198, 13, 39, 516, 527, 648, 701; 29/24.5

(56) References Cited

U.S. PATENT DOCUMENTS

| | | | |
|---|---|---|---|
| 421,027 | * | 2/1890 | Hammond . |
| 1,382,433 | * | 6/1921 | McCarty . |
| 1,647,254 | * | 11/1927 | Simmons . |
| 1,721,276 | * | 7/1929 | Marsilius . |
| 1,792,522 | | 2/1931 | Yates . |
| 2,057,488 | * | 10/1936 | Hochstadt . |
| 2,262,949 | * | 11/1941 | Lorentzen . |
| 2,418,515 | * | 4/1947 | Lewis . |

(List continued on next page.)

FOREIGN PATENT DOCUMENTS

| | | |
|---|---|---|
| 582326 | 9/1959 | (CA) . |
| 2136519 | 5/1996 | (CA) . |
| 273535 | 1/1987 | (EP) . |
| 265 564 | 5/1988 | (EP) . |
| 367066 | 12/1906 | (FR) . |
| 10550 | 1/1910 | (FR) . |
| 250743 | 11/1994 | (TW) . |
| 269841 | 2/1996 | (TW) . |

* cited by examiner

*Primary Examiner*—Rinaldi I. Rada
*Assistant Examiner*—Kim Ngoc Tran
(74) *Attorney, Agent, or Firm*—Foley & Lardner

(57) ABSTRACT

A mini-blind cutter for selective manual in-store sizing of a first mini-blind product and a second mini-blind product. Each of the mini-blind products include a head rail, a plurality of slats, and a bottom rail having a different geometry and or material composition. A die assembly is movable from a first position to a second position includes a first and second region to receive the first and second mini-blind products. A blade carrier assembly includes at least two blade carriers and permits permit independent translation of the blade carriers to accommodate the different sized mini-blind products.

19 Claims, 23 Drawing Sheets

U.S. PATENT DOCUMENTS 2,631,508 * 3/1953 Muehling .
2,644,520 * 7/1953 Nelson .
2,728,391 * 12/1955 Peddinghaus et al. .
2,789,639 * 4/1957 Lorentzen .
2,821,247 1/1958 Satosky .
2,827,686 3/1958 Adelman .
2,883,736 4/1959 Crane .
3,260,146 7/1966 Child .
3,263,544 8/1966 Margolien .
3,292,232 12/1966 Nilsson .
3,391,591 7/1968 Funke .
3,513,740 5/1970 Brughart .
3,564,893 2/1971 Richards et al. .
3,584,380 6/1971 Mehler et al. .
3,664,221 5/1972 Breetvelt .
3,677,117 7/1972 Cutter .
3,736,631 6/1973 Edixhoven .
3,750,509 8/1973 Kruse .
3,766,815 10/1973 Edixhoven .
4,067,252 1/1978 Peddinghaus et al. .
4,139,043 2/1979 Donofrio .
4,151,768 5/1979 Shockovsky .
4,188,693 2/1980 Edixhoven .
4,270,253 6/1981 Herb et al. .
4,338,710 7/1982 Stursa et al. .
4,407,614 10/1983 Muhr et al. .
4,457,197 7/1984 Wepner et al. .
4,457,351 7/1984 Anderson .
4,468,995 9/1984 Mireles-Saldivar .
4,545,100 10/1985 Gaillard et al. .
4,567,930 2/1986 Fischer .
4,639,987 2/1987 Georgopoulos .
4,730,372 3/1988 Tsuchida .
4,790,226 12/1988 Tsuchida .
4,807,363 2/1989 Clifton, Jr. .
4,819,530 4/1989 Huang .
4,823,449 4/1989 Chang .
4,876,795 10/1989 Chun-cheng .
4,907,325 3/1990 Hsu .
4,907,337 3/1990 Krüsi .
4,924,740 * 5/1990 Wright .................................. 83/527
4,987,765 1/1991 Nishimura et al. .
4,993,131 2/1991 Graves et al. .
5,037,253 8/1991 Molaro et al. .
5,056,388 10/1991 Dekker et al. .
5,072,494 12/1991 Graves et al. .
5,103,702 4/1992 Yannazzone .
5,170,689 12/1992 Dvorak .
5,215,512 6/1993 De Dompierre .
5,333,365 8/1994 Marocco et al. .
5,339,716 8/1994 Sands et al. .
5,349,730 9/1994 Anderson et al. .
5,456,149 10/1995 Elsenheimer et al. .
5,791,222 8/1998 Micouleau .
5,799,557 9/1998 Wang .
5,806,394 9/1998 Marocco .
5,816,126 10/1998 Pluber .
5,927,172 * 7/1999 Wang .................................... 83/454
6,003,218 * 12/1999 Schumann et al. .................. 29/24.5
6,079,306 6/2000 Liu .
6,178,857 1/2001 Marocco .

DUAL MINI-BLIND CUTTER

This application is a continuation-in-part of U.S. patent Ser. No. 08/900,987 filed Jul. 25, 1997 now abandoned.

FIELD OF THE INVENTION

This invention relates generally to the art of sizing window coverings such as mini-blinds. more particularly the present invention relates to a cutter for selective cutting of two mini-blind products, wherein the blinds are made of different material (e.g. vinyl and aluminum) and different geometric characteristics.

BACKGROUND OF THE INVENTION

Numerous types of window coverings are now being sold in a variety of outlets. Window coverings of the type with which the present invention is concerned include mini-blinds, as opposed to draperies and curtains which may be sold in the same outlets, but which involve different sizing requirements. The type of outlets that sell custom mini-blinds typically include custom specialty shops and department stores which usually ask the customer for window dimensions and then submit orders to factories or distribution centers where the products are cut to a specific size. Not only must the customer make two visits to these outlets to obtain the product, but the custom mini-blinds are relatively expensive.

Mass merchandisers also distribute mini-blinds. In many such outlets only stock sizes are carried, because some windows, especially in newer homes and offices are of standard dimensions. These mini-blinds are usually much less expensive than those obtained from custom outlets because of the economy realized from carrying a limited stock of sizes and because there are no sizing operations which must be performed on the products.

In recent years, a third option has been made available to the customer. This option involves the in-store sizing of mini-blinds and various other window coverings to customer specifications. An example of how in-store sizing can be accomplished is disclosed in commonly owned U.S. Pat. No. 5,339,716 issued Aug. 23, 1994 to Sands et al. and entitled "MINI BLIND CUTTER" (the '716 patent). This patent discloses a mini-blind cutter for cutting mini-blind slats, as well as mini-blind bottom rails and headrails to a desired size. The mini-blind cutter may be used to cut the mini-blind slats and rails on either end as a readjustment of mounting mechanisms or ladders is not required.

The mini-blind cutter disclosed in the '716 patent includes a framework having a receiving area for receiving the end of the mini-blind to be cut. A cutter blade is attached to a bar which is slidably mounted to the framework. This bar includes a rack engaged with a pinion gear that is rotated by a ratchet handle. Movement of the ratchet handle thus slides the bar along the framework and forces the cutter blade through the end portion of the mini-blind. The mini-blind cutter is used to cut the mini-blind slats, headrail and bottom rail on either end, so readjustment of the mounting mechanism or ladders is not required when sizing the mini-blind.

Additionally, commonly owned U.S. Pat. No. 5,456,149 issued Oct. 10, 1995 to Elsenheimer et al. and entitled "SIZING SYSTEMS FOR WINDOW COVERINGS" (the '149 patent) discloses a system for sizing various window products such as roller shades, mini-blinds, pleated shades and vertical blinds. This system is used in department stores and mass merchandising outlets. The '149 patent discloses a system having four stations with a flip-top horizontal surface containing sizing equipment on opposed sides. The system includes fixed cutters, e.g. for roller shades and for cutting the headrail of vertical blinds.

Another system for trimming a venetian blind assembly is disclosed in U.S. Pat. No. 4,819,530 issued Apr. 11, 1989 to Huang entitled "APPARATUS METHOD FOR TRIMMING A VENETIAN BLIND ASSEMBLY". The device disclosed in this patent employs a hydraulic or pneumatic cylinder or solenoid to drive the blade in order to cut the various components of the mini-blind.

Other mini-blind cutters are available to manually cut headrails manufactured from steel which include a drive mechanism consisting of either an elongated lever arm or a rotary input coupled with a cam driver device.

However, there are no mini-blind cutter mechanisms for use in in-store sizing which can accommodate two blind configurations having different shapes and wherein the blinds are made of different materials such as vinyl and steel.

Accordingly, it would be advantageous to be able to provide a mini-blind cutter which would be able to cut two different mini-blind products having different geometric or material characteristics, e.g. where the headrail and bottom rail components are formed from either steel or vinyl. It would also be advantageous if the system is compact and able to be used in conjunction with sizing systems such as the one described in the '149 patent referenced above.

SUMMARY OF THE PRESENT INVENTION

The present invention relates to a blind cutter for selective, in-store sizing of a first mini-blind product and a second mini-blind product having different geometric configurations. Each mini-blind product to be sized includes a headrail, a plurality of slats and a bottom rail. The blind cutter includes a framework and a die assembly coupled to the framework. The die assembly is moveable from a first position to a second position with respect to the framework. The die assembly preferably includes a first region for receiving a portion of the headrail, a plurality of slats and the bottom rail of the first mini-blind product, and a second region for receiving a portion of the headrail, a plurality of slats and the bottom rail of the second mini-blind product. The cutter further includes a blade carrier assembly attached to the framework. The blade carrier assembly includes a blade attached thereto. A drive system is connected to the framework and blade carrier assembly to provide translation of the blade. The blade is translated proximate the first region of the die assembly to size the first mini-blind product when the die assembly is in a first position. The blade is also translated proximate the second region of the die assembly to size the second mini-blind product when the die assembly is in a second position.

In another aspect of the invention, the frame includes a base plate having a bottom surface defining a base plane. The drive system includes a handle assembly disposed to rotate in a plane parallel to the base plane.

In yet another aspect of the invention the cutter also includes a drive system having a second blade carrier provided with a second blade. The two blade carriers are connected to the framework and blade carrier assembly to provide independent linear translation of a first blade carrier for a pre-determined first distance. The drive system further provides simultaneous linear translation of the first and second blade carriers for a pre-determined second distance.

In a further aspect of the invention a blind cutter for in-store sizing a mini-blind product including a head rail, a plurality of slats, and a bottom rail, the blind cutter includes a framework and a die assembly. The die assembly is coupled to the framework having a region for receiving a portion of each of the head rail, plurality of slats, and bottom rail. A blade carrier assembly is attached to the framework, and includes a first blade carrier having a first blade member attached thereto, and a second blade carrier having a second blade member attached thereto. A drive system is connected to the framework and blade carrier assembly to provide independent linear translation of the first blade carrier for a pre-determined first distance, and simultaneous linear translation of the first and second blade carriers for a pre-determined second distance.

In another aspect of the invention a blind cutter is capable of selectively in-store sizing a first mini-blind product and a different second mini-blind product. The blind cutter includes a framework and a die assembly coupled to the frame work. The die assembly includes a first region for receiving a portion of the head rail, plurality of slats and bottom rail of the first mini-blind product, and a second region for receiving a portion of the head rail, plurality of slats and bottom rail of the second mini-blind product. The die assembly is movable from a first position for cutting the first mini-blind product to a second position for cutting the second mini-blind product. A blade carrier assembly is attached to the framework and includes a first blade carrier having a first blade member attached thereto, and a second blade carrier having a second blade member attached thereto. A drive is connected to the framework and blade carrier assembly to provide linear translation of the first and second blade carriers to size the first mini-blind product when the die assembly is in the first position, and to size the second mini-blind product when the die assembly is in the second position.

Still a further aspect of the invention is a blind cutter for in-store sizing a mini-blind product including a head rail, a plurality of slats, and a bottom rail. The blind cutter includes a framework and a die assembly coupled to the framework. The die assembly has a region for receiving a portion of each of the head rail, plurality of slats, and bottom rail. A blade carrier assembly is attached to the framework and includes at least one blade carrier movable from a first extended position in which the mini-blind product is loaded into the blind cutter for sizing and a second retracted position in which the mini-blind product has been sized. A drive system includes a driving pawl and track and is connected to the framework and blade carrier assembly to provide linear translation of the at least one blade carrier to size the mini-blind product. The drive system further includes a switch for releasing the driving pawl from the track to permit manual movement of the first blade carrier from the retracted to the extended position.

BRIEF DESCRIPTION OF THE DRAWINGS

The invention will hereafter be described with reference to the accompanying drawings, wherein like reference numerals denote like elements, and.

DETAILED DESCRIPTION

Figure 1:
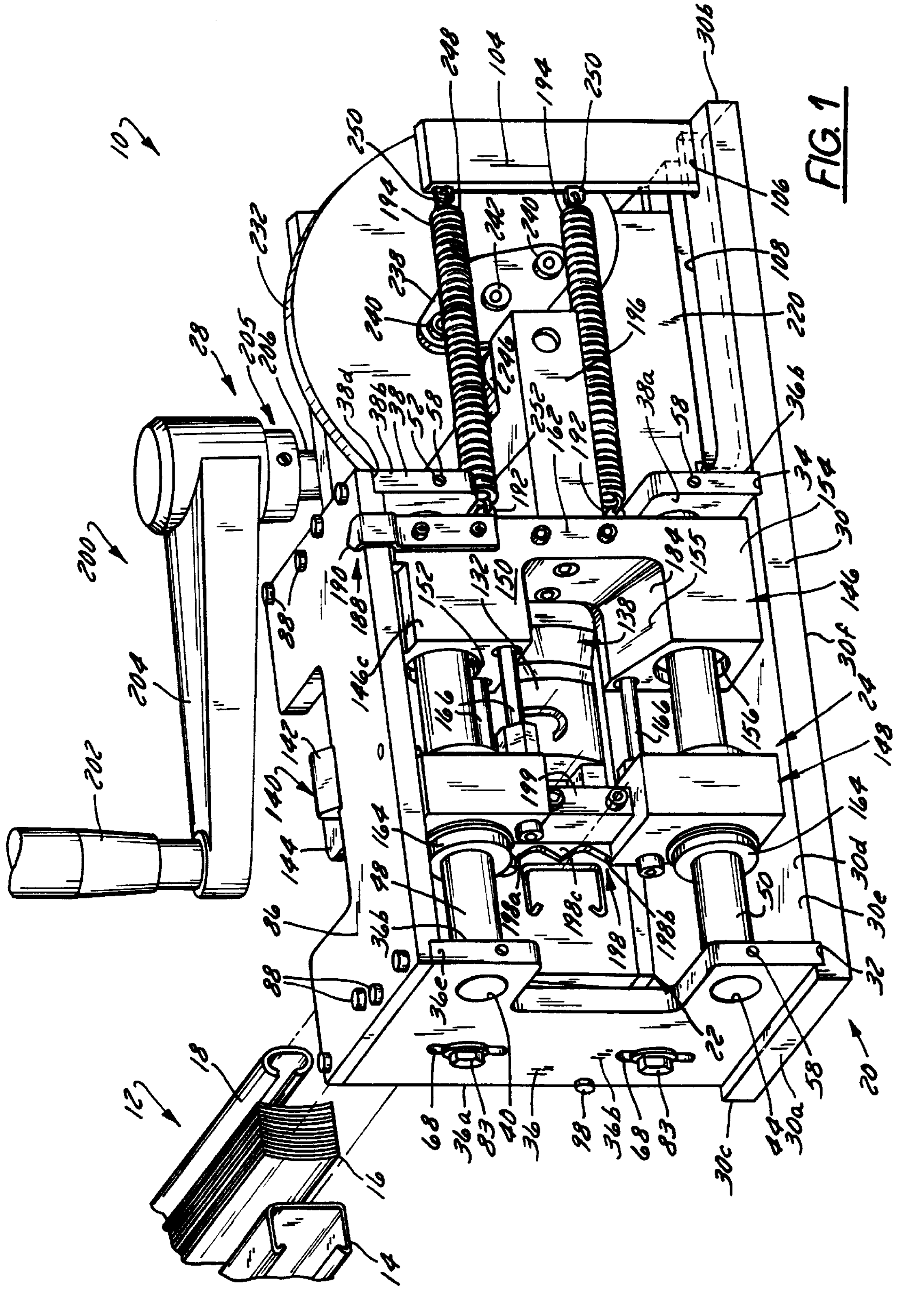
FIG. 1 is a perspective view of the right or exit side of the mini-blind cutter of the present invention.

Referring generally to FIG. 1 a mini-blind cutter 10 will be described. Cutter 10 is used to cut one or both ends of a mini-blind product 12 having a headrail 14, a plurality of slats 16 and a bottom rail 18. In the preferred embodiment both ends of the mini-blind product 12 is cut. All of these components may be downsized with cutter 10 to properly size the mini-blind for a given window opening. Cutter 10 may be used to cut two different mini-blind configurations. One exemplary first configuration includes a vinyl headrail, vinyl bottom rail and either aluminum or vinyl slats. A second exemplary configuration includes a steel headrail and bottom rail and aluminum slats. Cutter 10 could also be configured to cut steel slats.

In the preferred embodiment the geometric shape of the cross-section of the mini-blind components of the first and second configurations to be sized are also different. Cutter 10 could also be adapted to cut a wide variety of other combinations of mini-blind components or other components of pleated, cellular, venetian or vertical blinds.

Referring generally to FIG. 1, mini-blind cutter 10, according to the present invention, includes a framework or frame 20 supporting a movable die assembly 22 that works in cooperation with a carrier assembly 24. Die assembly 22 is movable from a first or lowered position to cut a mini-blind having the first configuration to a second or raised position to cut a mini-blind having the second configuration. Die assembly is shown in the first lowered position in FIG. 9 and in the second raised position in FIGS. 1 and 6.

A drive system 28 is supported on frame 20 to drive a portion of carrier assembly 24 relative to die assembly 22 to effectuate the cutting of the mini-blind components in either the first or second positions.

Referring generally to FIGS. 1–5, frame 20 includes a bottom plate 30 having a front side 30*a*, a rear side 30*b*, a loading side 30*c*, an exit side 30*d*, a top surface 30*e* and a bottom surface 30*f*. Bottom plate 30 further includes a front channel 32 proximate front side 30*a* and a center channel 34 located a set distance from front channel 32 in a direction toward rear side 30*b*. Front and center channels 32, 34 are parallel to one another and to front side 30*a*. Channels 32, 34 extend from loading side 30*c* to exit side 30*d* of bottom plate 30.

Frame 20 further includes a front plate 36 located in front channel 32, and a rear plate 38 located in center channel 34. Front plate and rear plate 36, 38 include an upper aperture 40, 42 and a lower aperture 44, 46 configured to receive an upper and lower shaft 48, 50 respectively. Upper and lower shafts 48, 50 are used in conjunction with carrier assembly 24. Each of front plate and rear plate 36, 38 includes a pair of threaded apertures 52 extending through an exit side edge 36*e*, 38*e* to upper apertures 40, 42 and lower apertures 44, 46 to receive a set screw 58 for setting the position of upper and lower shafts 48, 50.

Figure 14:
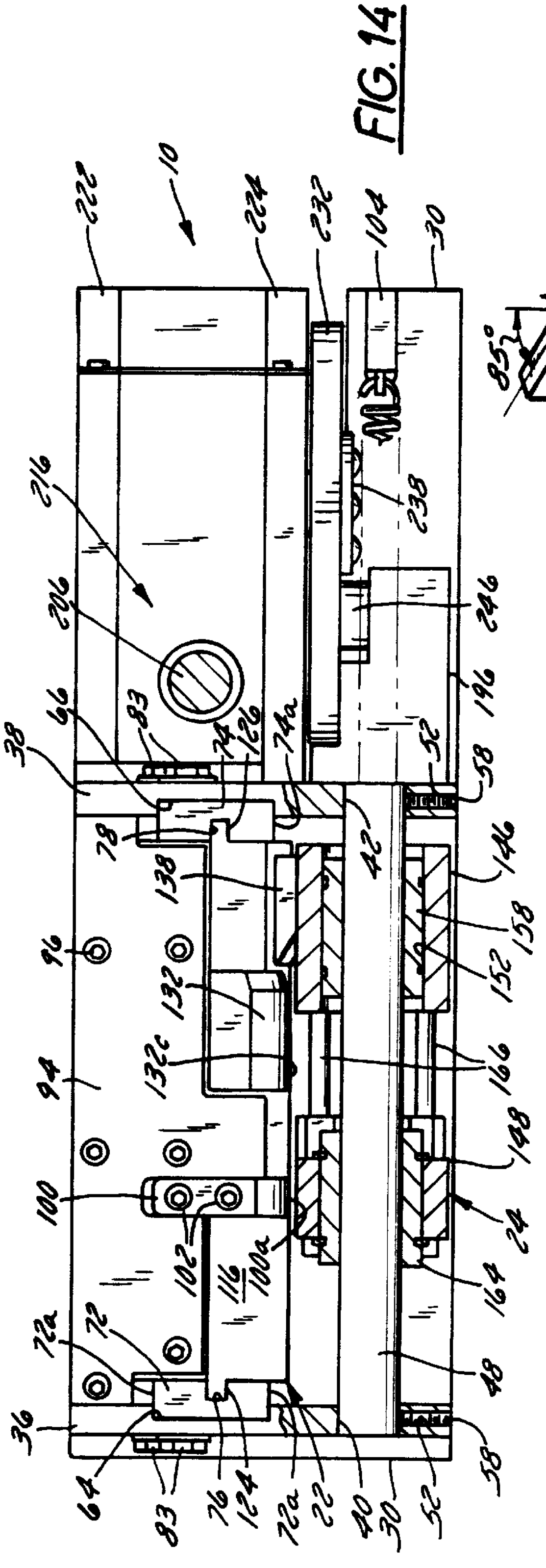
FIG. 14 is a cross-sectional view taken generally along line 14—14 of FIG. 6.
Figure 15:
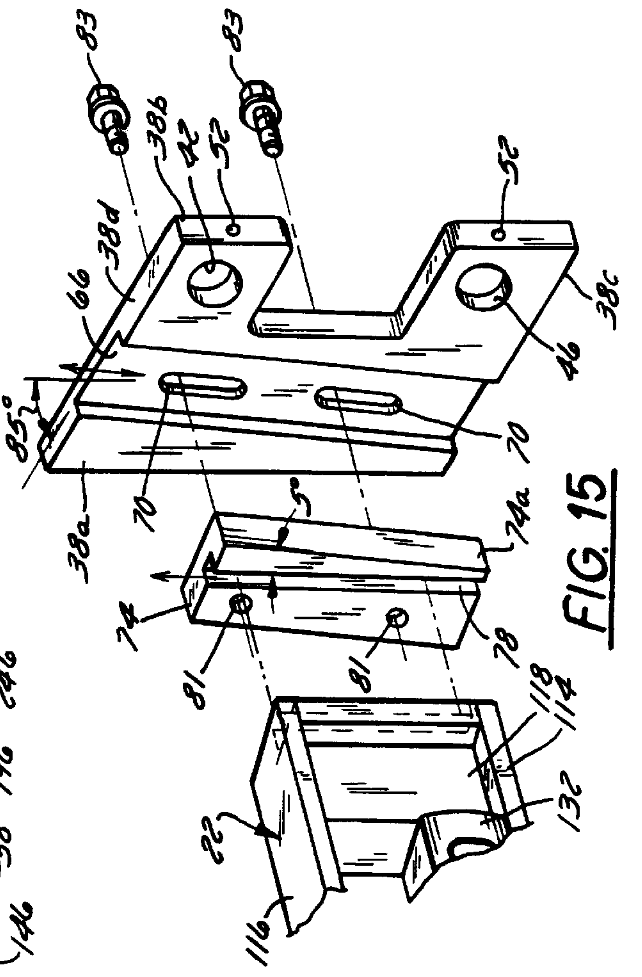
FIG. 15 is an exploded view of the rear end plate, slide mechanism and a partial fragmentary view of the die assembly of the mini-blind system of FIG. 1.

Each of front plate 36 and rear plate 38, includes an internal side 36*a*, 38*a* and an external side 36*b*, 38*b*. Internal sides 36*a* and 38*a* face one another while external sides 36*b*, 38*b* face away from one another. Each internal side 36*a*, 38*a* includes a channel 64, 66 formed therein. (See FIGS. 14 and 15). Each channel 64, 66 has an orientation of eighty five (85) degrees relative to a bottom edge 36*c*, 38*c* of each front and rear plate 36, 38 respectively. Each channel 64, 66 further includes a pair of slots 68, 70 centrally located in the channel and having an axis which is also orientated at eighty five (85) degrees relative to bottom edge 36*c*, 38*c*.

Frame 20 further includes a pair of slide blocks 72, 74. Each slide block has a width narrower than the width of each channel 64, 66 to permit each slide block, 72, 74 to slidably move within each respective channel 64, 66. Each slide block 72, 74 includes a groove 76, 78 which has an orientation of five (5) degrees relative to an outer edge 72*a*, 74*a* of slide block 72, 74 respectively. Each slide block 72, 74 is slidably located in channel 64, 66 of front and rear plates 36, 38 respectively. In this orientation each groove 76, 78 is perpendicular to bottom plate 30 regardless of the location of slide block 72, 74 within channels 64, 66.

Each slide block 72, 74 further includes a pair of threaded apertures 81. Each slide block 72, 74 is removably secured to front and rear plate 36, 38 respectively by a pair of screws 83 which are located through slots 68, 70 and threaded into apertures 81 of slide blocks 72, 74. By loosening screws 83 it is possible to move each slide block along channel 64, 66 to effectively move groove 76, 78 closer to or further from the exit side of cutter 10. This adjustment of slide blocks 72, 74 allows for optimal operation of cutter 10 as will be described below.

Frame 20 also includes a top plate 86 attached to front plate 36 and rear plate 38. Top plate 86 includes a plurality of through holes which are aligned with a plurality of threaded holes in a top portion 36*d*, 38*d* of front and rear plates 36, 38. Top plate 86 is attached to front and rear plates 36, 38 with a plurality of screws 88. Each screw 88 extends through a respective through hole and is threaded into a respective threaded hole.

Figure 13:
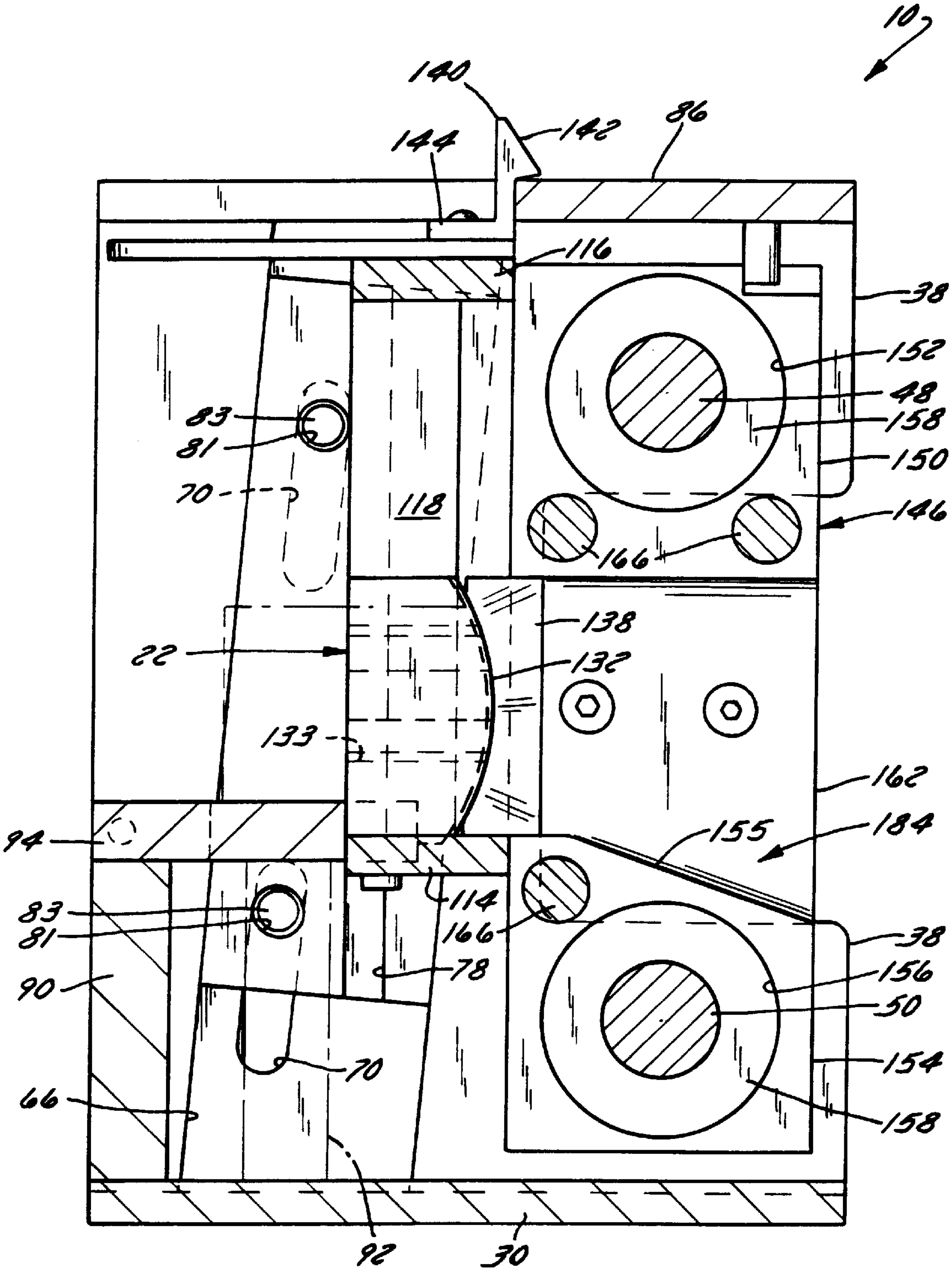
FIG. 13 is a cross-sectional view taken generally along line 13—13 of FIG. 6.

Additionally, frame 20 includes a first support plate 90 located between front plate 36 and rear plate 38 proximate loading side 30*c* of bottom plate 30. A second support plate 92 is located parallel to first support plate 90 a set distance from the left or loading side 30*c* of bottom plate 30. A shelf plate 94 is located parallel to bottom plate 30 and is supported atop first and second support plates 90, 92. (See FIGS. 2 and 13). Shelf plate 94 is attached to first and second support plates 90, 92 with a plurality of screws 96. Additionally shelf plate 94 is attached to front plate 36 and rear plate 38 with a pair of screws 98.

Shelf plate 94 supports a slat shear plate 100 that is used in conjunction with die assembly 22 and carrier assembly 24 which will be described in greater detail below. Slat shear plate 100 is attached to shelf plate 94 with a pair of screws 102. (See FIG. 2).

Frame 20 also includes a spring tower 104 attached to bottom plate 30 in a slot 106 proximate the rear side 30*b* of bottom plate 30. Bottom plate 30 further includes a through slot 108 extending from rear side 30*b* of bottom plate 30 a set distance toward front side 30*a*. (See FIGS. 1 and 4).

Figure 10:
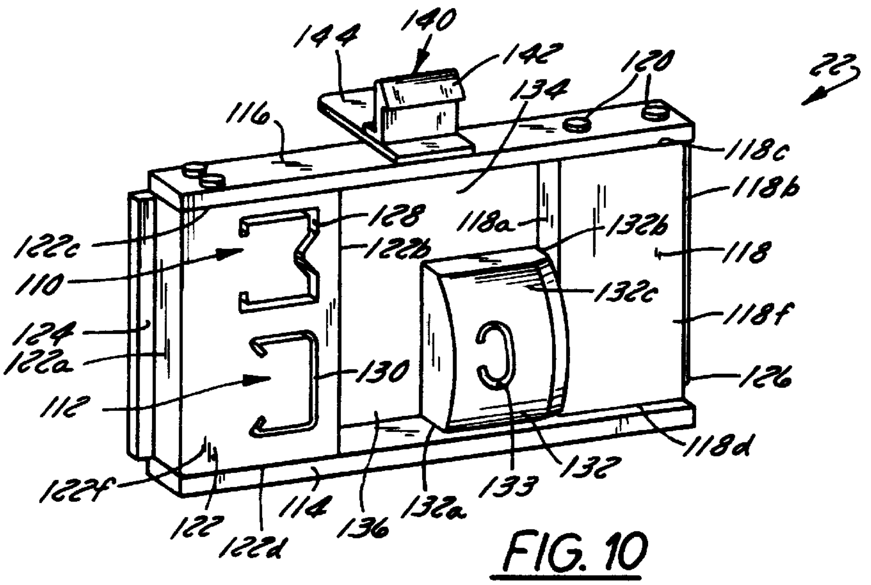
FIG. 10 is an isometric view of the die assembly of the mini-blind cutter of FIG. 1.
Figure 11:
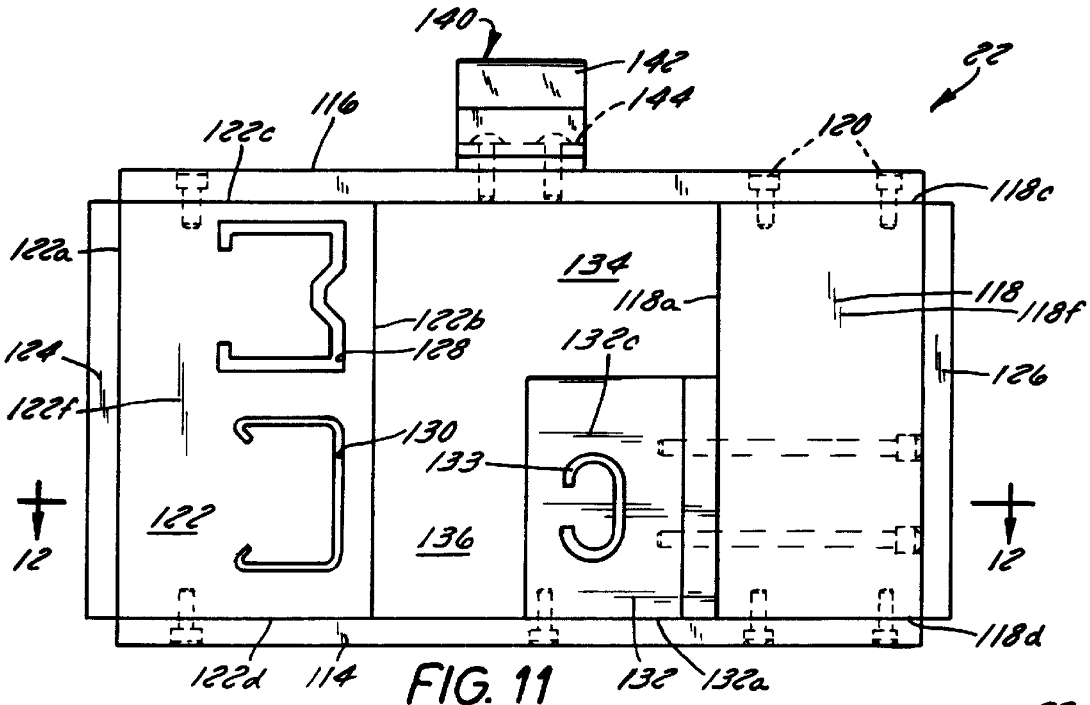
FIG. 11 is a right elevation view of the die assembly of FIG. 10.
Figure 12:
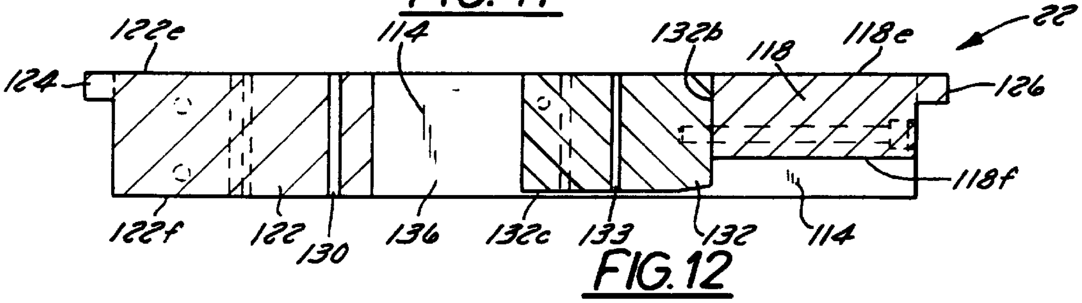
FIG. 12 is a cross-sectional view taken generally along line 12—12 of FIG. 11.

Referring generally to FIGS. 10–12, die assembly 22 will now be described in greater detail. As noted above die assembly 22 cooperates with frame 20 to permit die assembly 22 to be moved from a first lowered position for cutting a first mini-blind product having a first configuration to a second raised position for cutting a second mini-blind product having a second configuration. Die assembly 22 includes a first region 110 for receiving a portion of each of the headrail, plurality of slats, and bottom rail of the first mini-blind product, and a second region 112 for receiving a portion of each of the headrail, plurality of slats, and bottom rail of the second mini-blind product.

Die assembly 22 includes a bottom die plate 114 and an opposing top die plate 116. Die assembly 22 further includes a support side plate 118 located intermediate top die plate 116 and bottom die plate 114. Support side plate 118 is attached to top die plate 116 and bottom die plate 114 with screws 120. Support side plate 118 has a front side 118*a*, a rear side 118*b*, a top side 118*c*, a bottom side 118*d*, a loading side surface 118*e* and a cutting side surface 118*f*.

Die assembly 22 further includes a headrail die block 122 attached intermediate top die plate 116 and bottom die plate 114 distal support side plate 118. Headrail die block 122 includes a front side 122*a*, a rear side 122*b*, a top side 122*c*, a bottom side 122*d*, a loading side surface 122*e* and a cutting side surface 122*f*.

Headrail die block 122 and support side plate 118 each include a guide flange 124, 126 extending from front side 122*a* and rear side 118*b* respectively. Guide flanges 124, 126 are employed to guide die assembly 22 within grooves 76, 78 as it is moved from the first position to the second position. Each flange 124, 126 extends from top side 122*c*, 118*c* to bottom side 122*d*, 118*d* respectively.

In the preferred embodiment each flange 124, 126 is rectangular and extends outward from headrail die block 122 and support side plate 118. (See FIG. 10). Of course other geometric configurations that cooperate with grooves 76, 78 may also be used.

Headrail die block 122 includes a first slot 128 having the shape of the cross-section of the first headrail and a second slot 130 having the shape of the a cross-section of the second headrail. The first slot 128 is located proximate top die plate 116 and second slot 130 is located proximate bottom die plate 114.

Die assembly 22 further includes a bottom rail die 132 having a bottom surface 132*a* and a rear surface 132*b*. Bottom rail die 132 includes a slot 133 having the configuration of the cross-section of the bottom rail of the second configuration. Bottom surface 132*a* of bottom rail die 132 is located adjacent bottom die plate 30. Rear surface 132*b* of bottom rail die 132 is located adjacent support side plate 118. In this manner die assembly 22 includes a first opening or receiving area 134 defined by the open space intermediate headrail die block 122 and support side plate 118, and a second opening 136 defined by the space intermediate headrail die block 122 to bottom rail die 132.

Bottom rail die 132 also includes a cutting side surface 132*c* having a curved form configured to match the curved form of a cutting blade 138 of the carrier assembly 24. Similarly, slat shear plate 100 includes a cutting side surface 100*a* having a curved form configured to match the curved form of cutting blade 138.

Die assembly 22 further includes a catch lever 140 manufactured or formed from a nylon material. Catch lever 140 includes a beveled catch portion 142 configured to secure die assembly in the second position. Catch lever 140 also includes a lift lever 144 to aid in the raising and lowering of die assembly 22 from the first lowered position to the second or raised position. Catch lever 140 must have sufficient resiliency to permit beveled catch portion 142 to engage and disengage top plate 116 by an operator without excessive force. Additionally, catch lever 140 must have sufficient strength to maintain die assembly in the raised second position. Although nylon is the preferred material, other materials having similar characteristics could be used.

Referring again to FIG. 1, carrier assembly 24 will now be described in greater detail. Carrier assembly 24 includes a slat/bottom rail blade carrier 146 (hereinafter slat carrier) and a headrail blade carrier 148 (hereinafter headrail carrier). Each of the slat carrier 146 and headrail carrier 148 is independently and slidably attached to upper shaft 48 and lower shaft 50. As described above, upper shaft 48 and lower shaft 50 are located within an upper aperture 40, 42 and a lower aperture 44, 46 of front plate 36 and rear plate 38 respectively. Upper shaft 48 and lower shaft 50 are fixed relative to front plate 36 and rear plate 38 by set screws 58.

Slat carrier 146 includes an upper section 150 having a bearing aperture 152 extending therethrough and a lower section 154 having a bearing aperture 156 extending therethrough. A pair of bearings 158 are press fit within bearing apertures 152, 156. Slat carrier 146 slidably moves on upper and lower shafts 48, 50 by means of pair of press fit bearings 158. A center region 162 is integrally formed with and connects upper section 150 and lower section 154 together.

Similarly, headrail carrier 148 is slidably located on upper shaft 48 and lower shaft 50 by a pair of bearings 164. While in the preferred embodiment the pair of bearings 164 is not press fit, it is possible to employ press fit bearings in the headrail carrier as well as the slat carrier. The use of press fit bearings allows for greater stability of the carriers during the cutting operation.

Slat carrier 146 is movably connected to headrail carrier 148 by means of at least one connecting rod 166. However, in the preferred embodiment three connecting rods 166 are utilized. Each connecting rod 166 includes a first bolt 167 extending through a respective aperture 170 in headrail carrier 148 and threadably secured to a spacer 172. In this manner spacer 172 is fixed relative to headrail carrier 148. A cap screw 174 having a head 176 extends through a non-threaded aperture 178 in the slat carrier 146 and is threadably secured to spacer 172. Each aperture 170 includes a counter bore 180 having a depth equal to the length of head 176. This permits the top of head 176 to be flush with an external or rear surface 146*a* of slat carrier 146.

Figure 16:
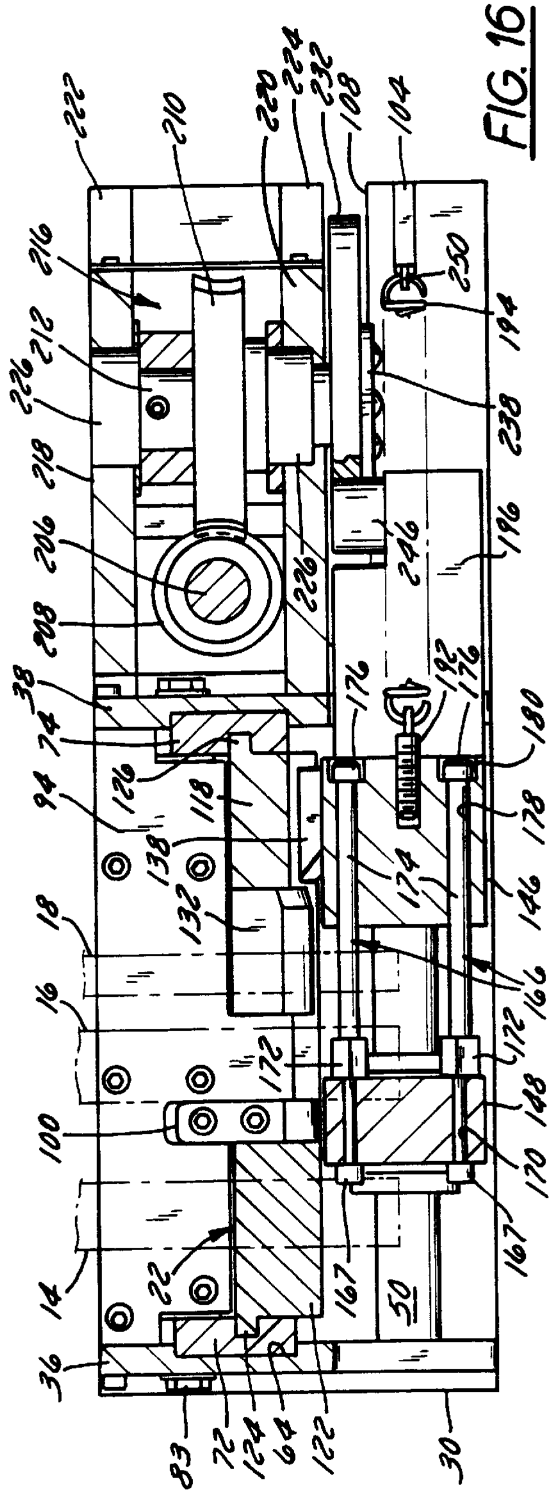
FIG. 16 is a cross-sectional view taken generally along line 16—16 of FIG. 6 in the starting position.
Figure 17:
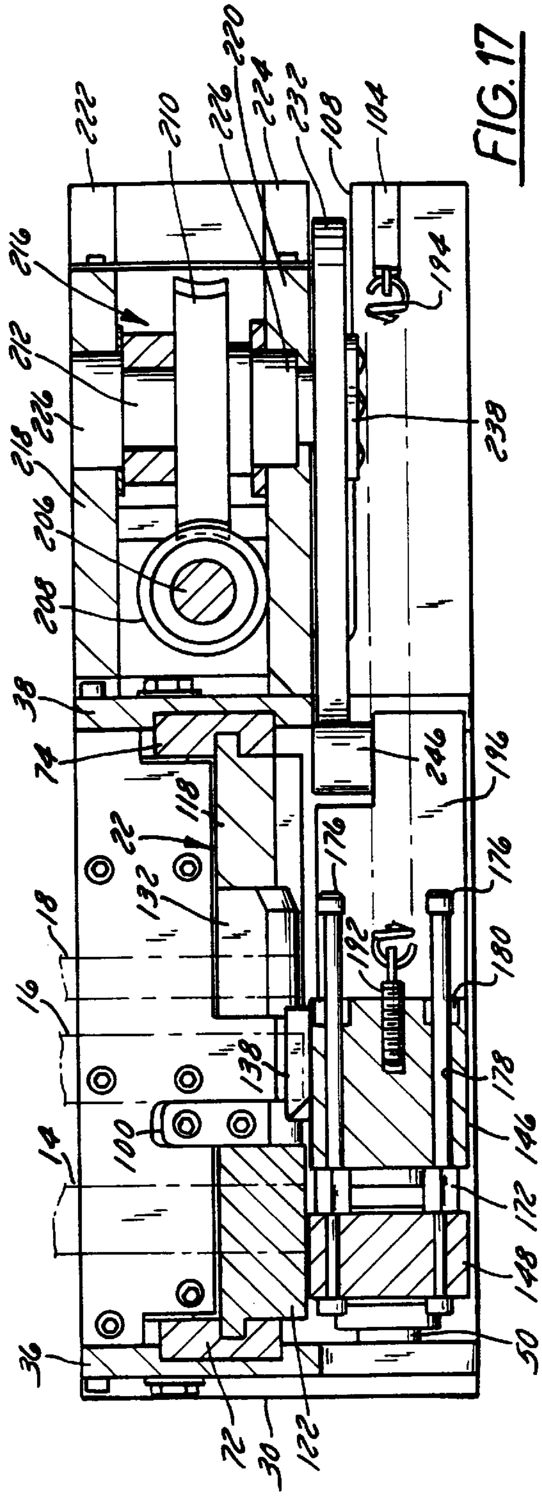
FIG. 17 is a cross-sectional view taken generally along line 16—16 of FIG. 6 in the fully extended position.

Connecting rods 166 establish a maximum and minimum distance between slat carrier 146 and headrail carrier 148. The maximum distance is achieved when head 176 is seated within the base of counter bore 180. (See FIGS. 1 and 16). The minimum distance is achieved when an internal or front surface 146*b*, of slat carrier 146 is adjacent spacer 172. (See FIG. 17). In the minimum distance position, head 176 of cap screw 174 is a set distance from slat carrier 146.

Slat carrier 146 further includes blade 138 secured to the center region 162 by means of two screws extending therethrough. (See FIG. 1). The geometry of blade 138 is described in the ’716 patent referred to above and is incorporated herein by reference. Slat carrier 146 also includes a chute region 184 located proximate blade 138 and is defined by the open region intermediate upper section 150 and lower section 154. Lower section 154 includes a top beveled surface 155 having a sloped region extending downward toward the cutting side 30*d* of base 30. Chute region 184 permits the cut portions of the bottom rail and slats to easily exit cutter 10 to a waste receptacle for example. (See FIG. 1).

An indicator 188 is attached to cutting side surface 146*c* of upper section 150 of slat carrier 146. Indicator 188 includes a pointer 190 that extends over top plate 86 to indicate the position of slat carrier 146 during the cutting process. Top plate 86 may additionally include indicia indicating the position of slat carrier 146 during the cutting process.

Slat carrier 146 further includes a pair of spring attachment bosses 192 attached to rear surface 146*a* of slat carrier 146. Each boss 192 includes an aperture for receiving an end of a return coil extension spring 194. In the preferred embodiment two springs 194 are employed. (See FIG. 6).

Also attached to slat carrier 146 is an arm 196 which communicates with drive system 28. Arm 196 is attached to rear surface 146*a* of slat carrier 146 with screws. As illustrated in FIG. 1, the screws attaching arm 196 extend through center region 162. In the preferred embodiment center region 162 includes through holes and arm 196 includes a pair of threaded holes to securably receive the screws.

Turning to headrail carrier 148, a piercing blade 198 is attached to a center portion 199 of headrail carrier 148. Piercing blade 198 has a "W" shaped configuration, including a center piercing section 198*a* and two side sections 198*b*, extending from center piercing section 198*a*. Piercing blade 198 has a substantially uniform thickness. However, piercing blade 198 may also have a beveled region proximate the cutting portions of the center and side sections 198*a*, 198*b*. The uniform thickness provides for a more uniform cut and longer blade life.

Figure 2:
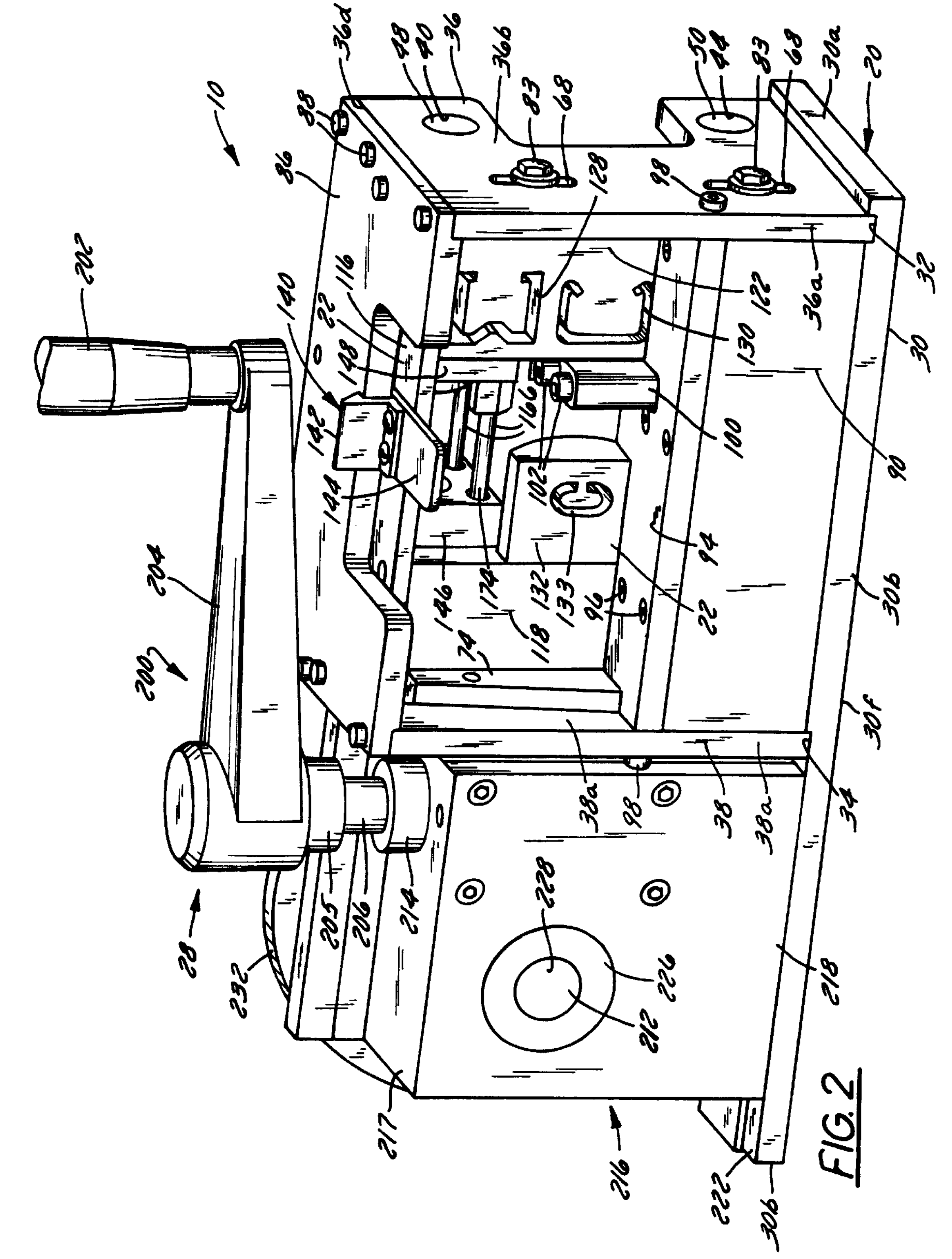
FIG. 2 is a perspective view of the left or loading side of the mini-blind cutter of FIG. 1.
Figure 3:
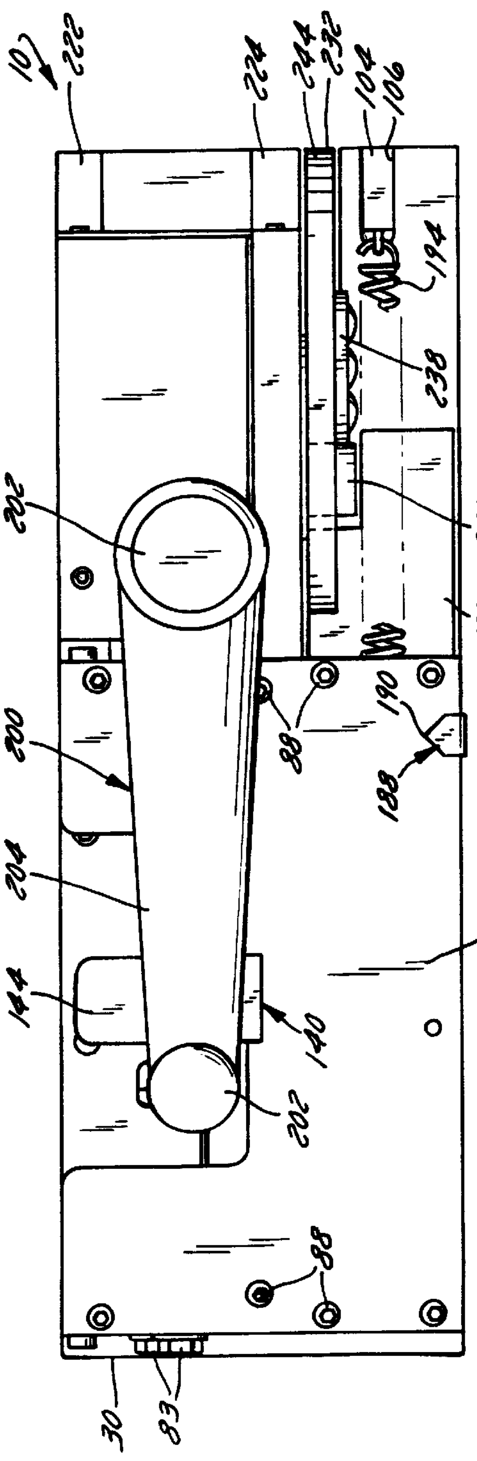
FIG. 3 is a top plan view of the cutter shown in FIG. 1.
Figure 4:
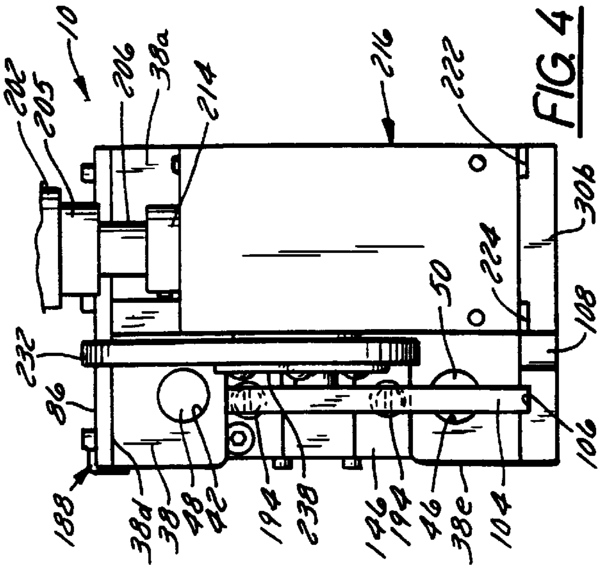
FIG. 4 is a rear elevation view of the mini-blind cutter of FIG. 1.
Figure 5:
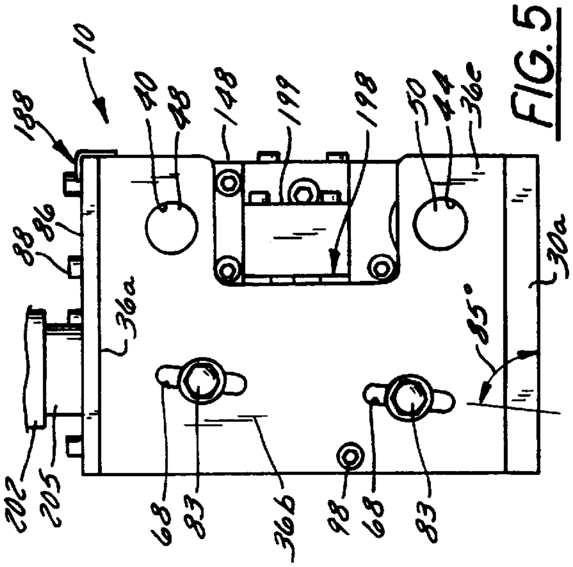
FIG. 5 is a front elevation view of the mini-blind cutter of FIG. 1.
Figure 8:
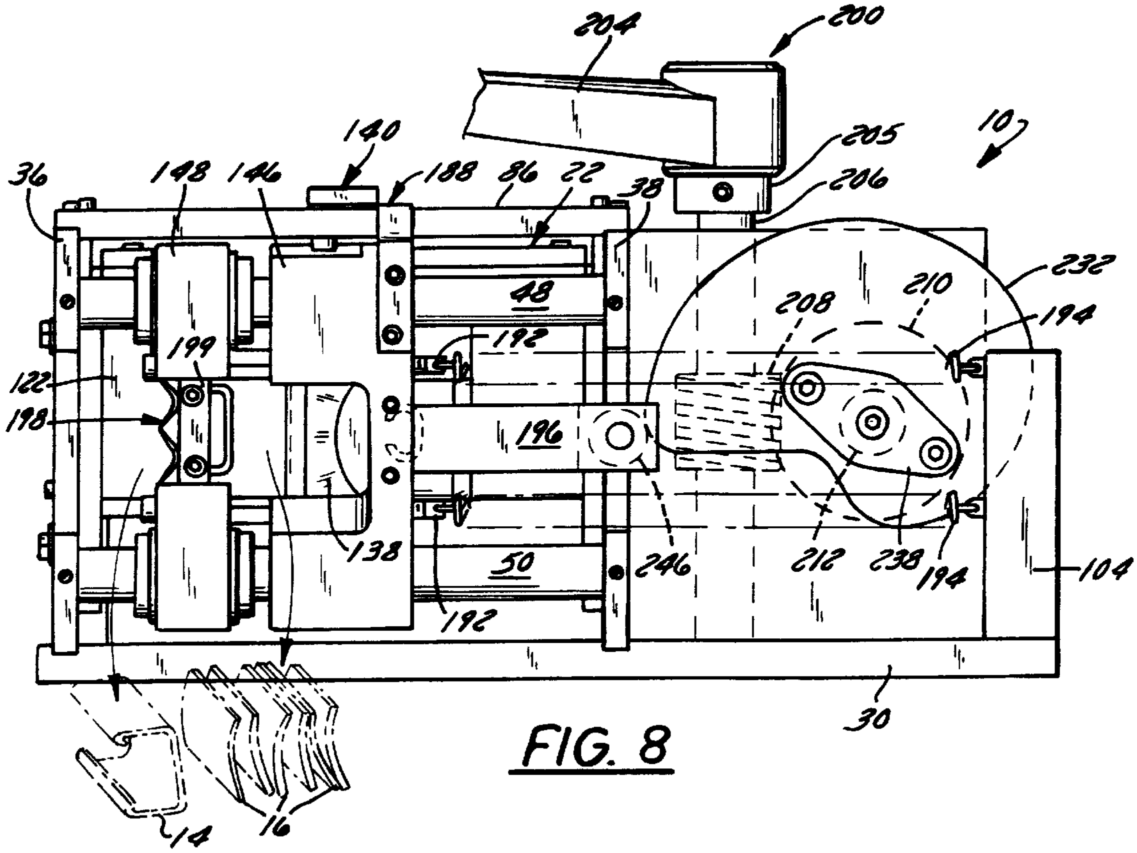
FIG. 8 is an elevation view of the mini-blind cutter of FIG. 1 in the fully extended position.

Referring to FIGS. 1, 2 and 8 drive system 28 will now be described. Drive system 28 includes a handle assembly 200 having a handle 202 pivotally attached to a handle arm 204. A clutch bearing 205 is attached to arm 204 distal handle 202 to limit movement of handle arm 204 in a single rotary direction. In the preferred embodiment the handle assembly is supplied by Reid Tool Supply located in Muskegon Michigan and identified by part number KHQ-20.

Handle assembly 200 is operated in a plane parallel to the plane defined by top plate 86. Further, handle arm 204 is operable in a plane parallel to the plane in which the mini-blind to be sized is located during the sizing operation. Handle 202 includes a longitudinal axis which is transverse to the plane of operation of the handle assembly 200. Handle 202 may be pivoted for storage such that the longitudinal axis of handle 204 is substantially parallel to handle arm 204. This feature allows cutter 10 to be more compact for shipping, as well as during use with the device described in the '149 patent.

Handle arm 204 is further attached to a shaft 206 having a worm 208 attached thereto. (See FIG. 8 in dashed lines). A worm gear 210 is driven by worm 208. A second output shaft 212 is coupled to worm gear 210. (See FIGS. 16–18). In the preferred embodiment, the worm and worm gear are selected to provide a thirty to one ratio. That is thirty rotations of handle assembly 200 results in one rotation of output shaft 212. However other ratios may be employed as well. Preferably a ratio of between ten to one and forty to one may be employed. Depending on the material of the blinds to be cut the ratio may vary to provide the requisite mechanical advantage required for operation by an operator for in-store sizing.

Shaft 206 is secured to a drive system housing 216 by means of a sleeve bearing 214 that is attached thereto. Drive system housing 216 includes a load side plate 218 and an exit side plate 220. Load side plate 218 and exit side plate 220 are positively located in channels 222, 224 respectively in bottom plate 30 (See FIGS. 1, 2 and 14). Drive system housing 216 further includes a housing cover 217 which is attached to exit side plate 220.

Sleeve bearing 214 is attached to load side plate 218. Shaft 206 is positively located relative to the sleeve bearing by a pair of collars attached to shaft 206 proximate the top and bottom of the sleeve bearing.

Output shaft 212 is rotatably attached to load side plate 218 and exit side plate 220 by a pair of bearings 226. Output shaft 212 includes a first end 228 located proximate load side plate 218 and an opposing second end 230. Additionally, output shaft 212 includes an elongated tab or key extending a set distance along the longitudinal axis of the output shaft proximate second end 230. A cam 232 having a keyway 234 is located on output shaft 212 having a key such that keyway 234 is positively located by key 236. (See FIG. 6). A cam attachment plate 238 is attached to cam 232 with two screws 240. Cam attachment plate 238 is further secured to output shaft 212 with a single screw 242.

Figure 6:
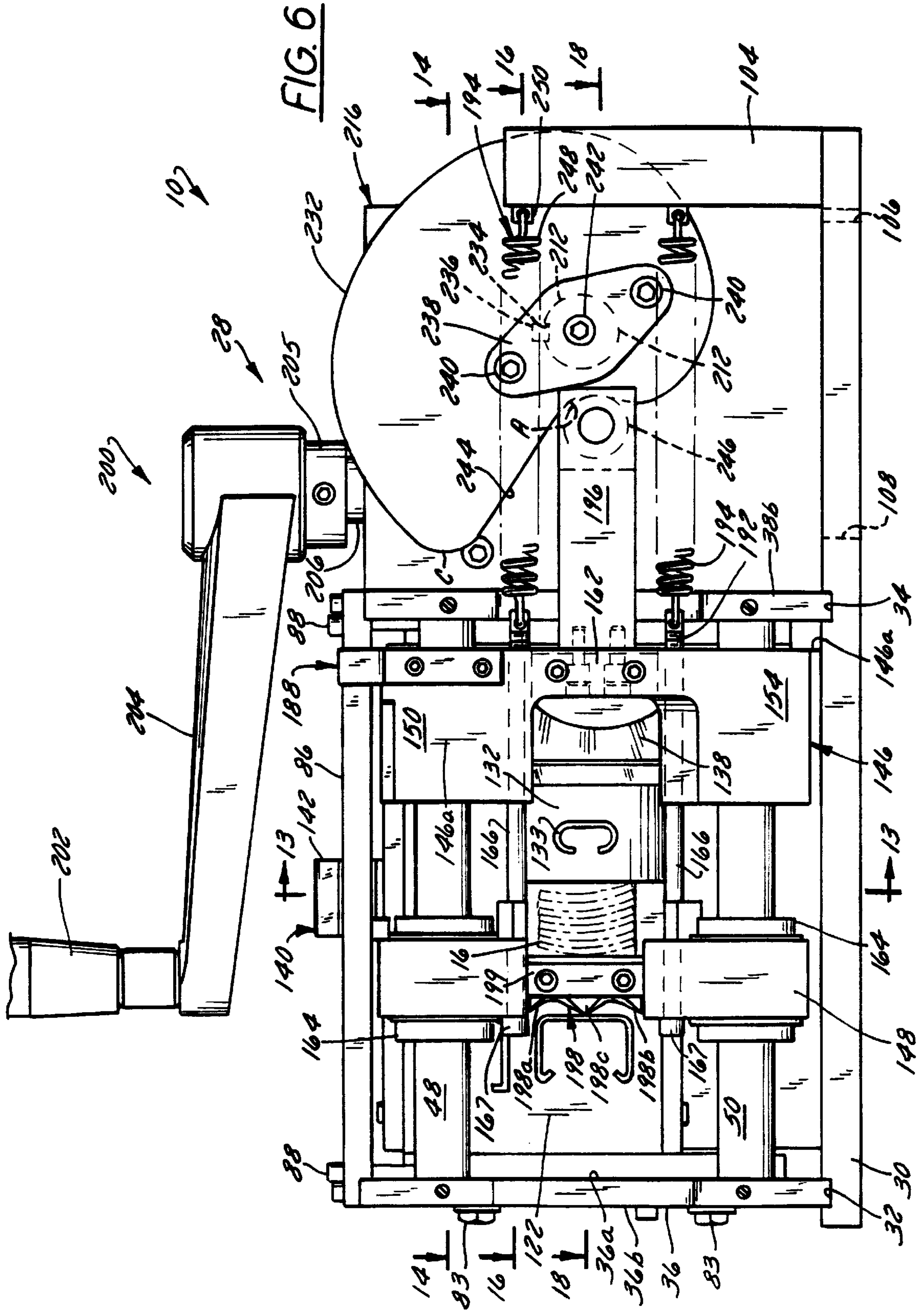
FIG. 6 is an elevation view of the right side of the mini-blind cutter of FIG. 1.
Figure 7:
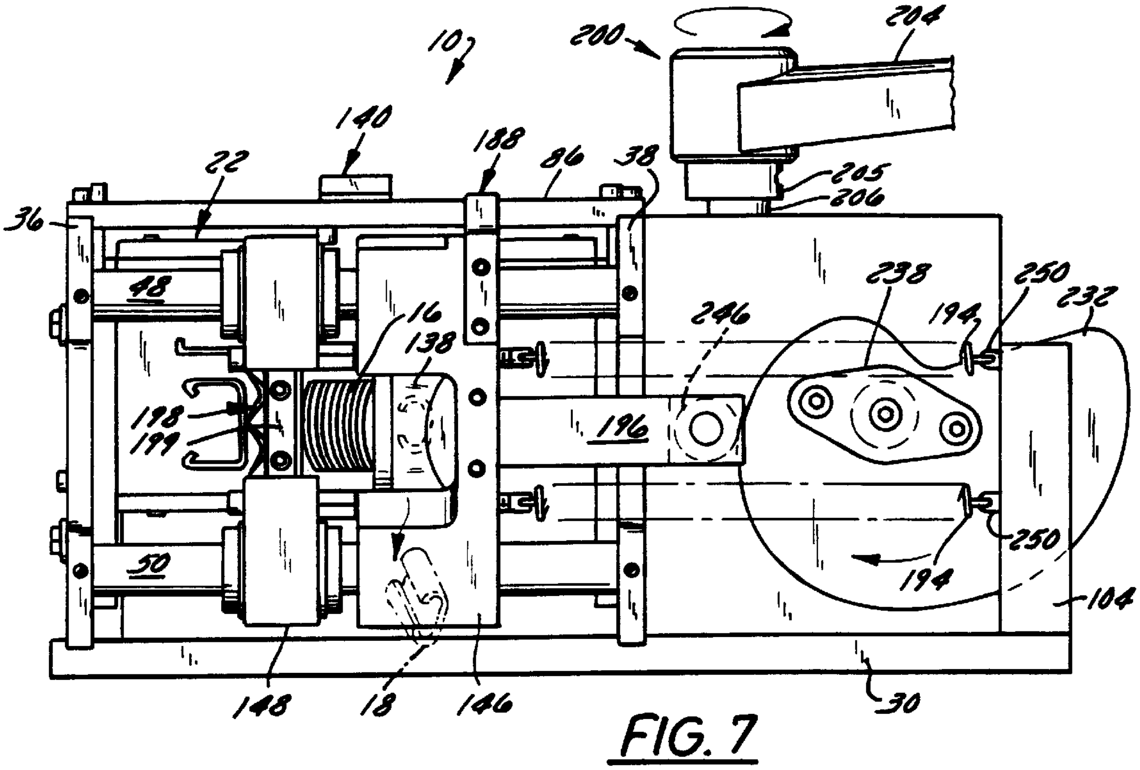
FIG. 7 is an elevation view of the mini-blind cutter of FIG. 1 in a first engaged position.

Referring to FIGS. 1 and 6 cam 232 includes an operating edge 244. A follower 246 is pivotally attached to arm 196. Follower 246 is maintained in contact with operating edge 244 of cam 232 by means of extension springs 194. In the preferred embodiment each extension spring 194 is formed from a 0.072 diameter wire, five inches long and rated at 8.4 pounds per inch. Of course other springs may be utilized that are able to retract headrail carrier and slat carrier, by biasing follower 246 against cam operating edge 244. Each extension spring 194 is attached at a first end 248 to a boss 250 on spring tower 104 and at a second end 252 to boss 192 on slat carrier 146. Extension springs 194 are always in tension thereby biasing follower 246 against cam operating edge 244.

As noted above it is important for optimal cutting performance that blades 138, 198 of headrail and slat carriers 146, 148 respectively be in close proximity to bottom rail die 132, slat shear plate 100 and headrail die 122. In order to maximize dimensional integrity of slat carrier 146 relative to die assembly 22, press fit bearings are utilized to minimize potential deflection of the slat carrier blade 138 during the cutting.

By design, the cutting surface of blades 138, 198 are proximate the bottom rail die 132, shear plate 100 and head rail die 122 respectively. However, as a result of component variability and resulting tolerance stack up, as well as wear of the blades, it is desirable to be able to adjust the position die assembly 22 relative to the cutting surface of blades 138, 148.

As discussed above frame 20 includes slide blocks 72, 74 which are adjustably located in channels 64, 66 of front and rear plates 36, 38 respectively. Each slide block 72, 74 is adjusted upwardly or downwardly within channels 64, 66. Movement of slide block 72, 74 upward toward the top the plates 36, 38 results in movement of die assembly 22 toward the exit side of cutter 10. Similarly, downward movement of slide blocks 72, 74 results in movement of die assembly 22 toward the loading side of cutter 10.

Since slide blocks 72, 74 are independently adjustable it is possible to independently adjust each end of die assembly 22. By independent adjustment of the slide blocks, it is possible to compensate for relative wear of blades 138, 198 if the blades do not wear at the same rate.

The operation of cutter 10 and the interaction of the various components detailed above will now be described. For purposes of describing the various components of mini-blind cutter 10, the front of cutter 10 is the portion that faces the operator when utilizing cutter 10. Specifically, the operator faces front end plate 36 when operating cutter 10. (See FIG. 5). The rear of cutter 10 is opposite the front and includes the rear side 30*b* of base plate 30. (See FIG. 4). A longitudinal axis of cutter 10 extends down the center of cutter 10 from the front of the cutter 10 to the rear of cutter 10. The loading side of cutter 10 is the side in which the headrail components are loaded into cutter 10 to be cut.

The loading side corresponds to the left side of cutter 10 when the operator is facing the front of cutter 10. (See FIG. 2). Similarly, the right side, the side opposite the loading side, is referred to as the exit side. This is the side from which the cut portions of the mini-blind are expelled after they are cut. The transverse direction of cutter 10 is the direction perpendicular or normal to the longitudinal axis toward the loading or exit sides. Finally, a base plane is defined by the bottom surface **30*f* of base plate 30**.

Figure 9:
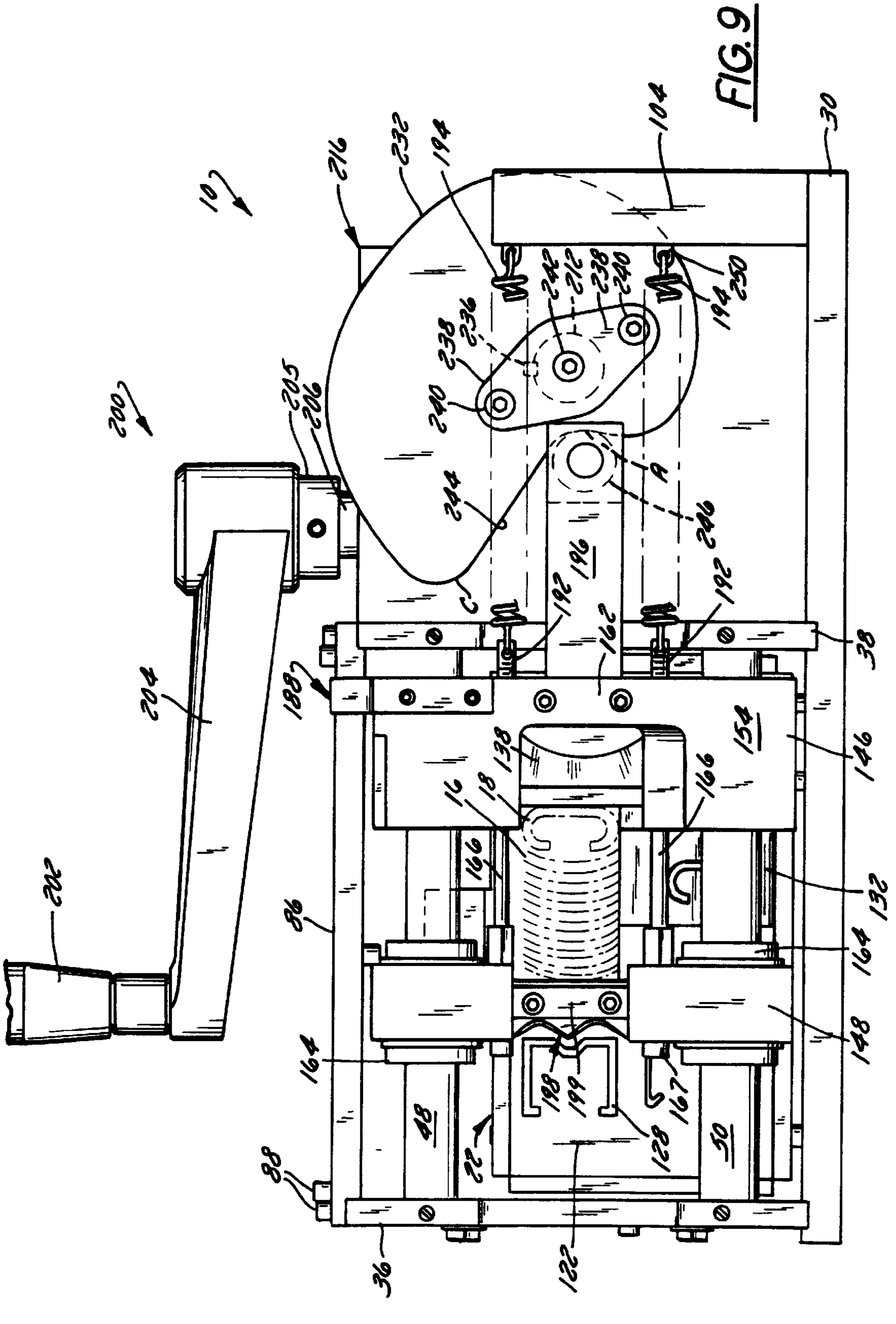
FIG. 9 is an elevation view of the mini-blind cutter of FIG. 1 in the loading position where the die assembly is in the first or lower position.

Turning now to the operation of cutter 10 itself, the two modes of operation as discussed above will be addressed. In the first mode of operation, as illustrated in FIG. 9, die assembly 22 is in a first or lower position such that first slot 128 of headrail die 112 and first receiving area 134 are located proximate shelf plate 94. In this first mode of operation a mini-blind product having a first configuration is sized. As discussed above, for purposes of illustration the first configuration will include a headrail and bottom rail formed from vinyl and a plurality of slats formed of vinyl or aluminum.

In the second mode of operation as illustrated in FIGS. 1 and 6, die assembly 22 is in the second or raised position such that second slot 130 of headrail die 112, second receiving area 136 and bottom die 132 are located proximate shelf plate 94. In this second mode of operation a mini-blind product having a second configuration is sized. The exemplary mini-blind product of the second configuration includes a headrail and bottom rail formed from steel and a plurality of slats formed of aluminum or steel. It should also be noted that the first and second blind configurations also have different geometric shapes.

Die assembly 22 is moved from the first position to the second position by lifting lever 144 in the upward direction until catch 142 engages top plate 86. (See FIG. 1). In a similar manner die assembly 22 may be moved from the second position back to the first position by depressing catch 142 toward the loading side of cutter 10 thereby releasing lever catch from top plate 86. Once catch 142 is released, die assembly 22 may be lowered to the first position by the operator with lever 144.

While die assembly 22 is movable in an up/down direction transverse to the base plane, die assembly 22 is positively located in frame 20 in the other directions. This is accomplished by engagement of flanges 124, 126 within grooves 76, 78 of slide blocks 72, 74 which are secured within channels 64, 66 of front and rear plates 36, 38.

For both modes of operation the starting position of the drive system and carrier assembly is the same. As shown in FIGS. 6 and 9 drive system and carrier assembly is in the start position. In this start position, follower 246 is located adjacent point A on cam 232 which represents the point of minimum radius of cam 232. Slat carrier 146 is at a point closest to rear plate 38. In the start position the distance between slat carrier 146 and headrail carrier 148 is maximized. Additionally, in this position the heads 176 of connecting rods 166 are located within counter bores 180.

For illustrative purposes the operation of cutter 10 in the second mode of operation will be described first. With die assembly 22 in the second or raised position, headrail 14, slats 16, and bottom rail 18 of the first mini-blind configuration are loaded into cutter 10 for sizing. Facing the front plate 36 of cutter 10 the operator loads the blind into cutter 10 from the left or loading side of cutter 10. (See FIGS. 1 and 18).

Figure 18:
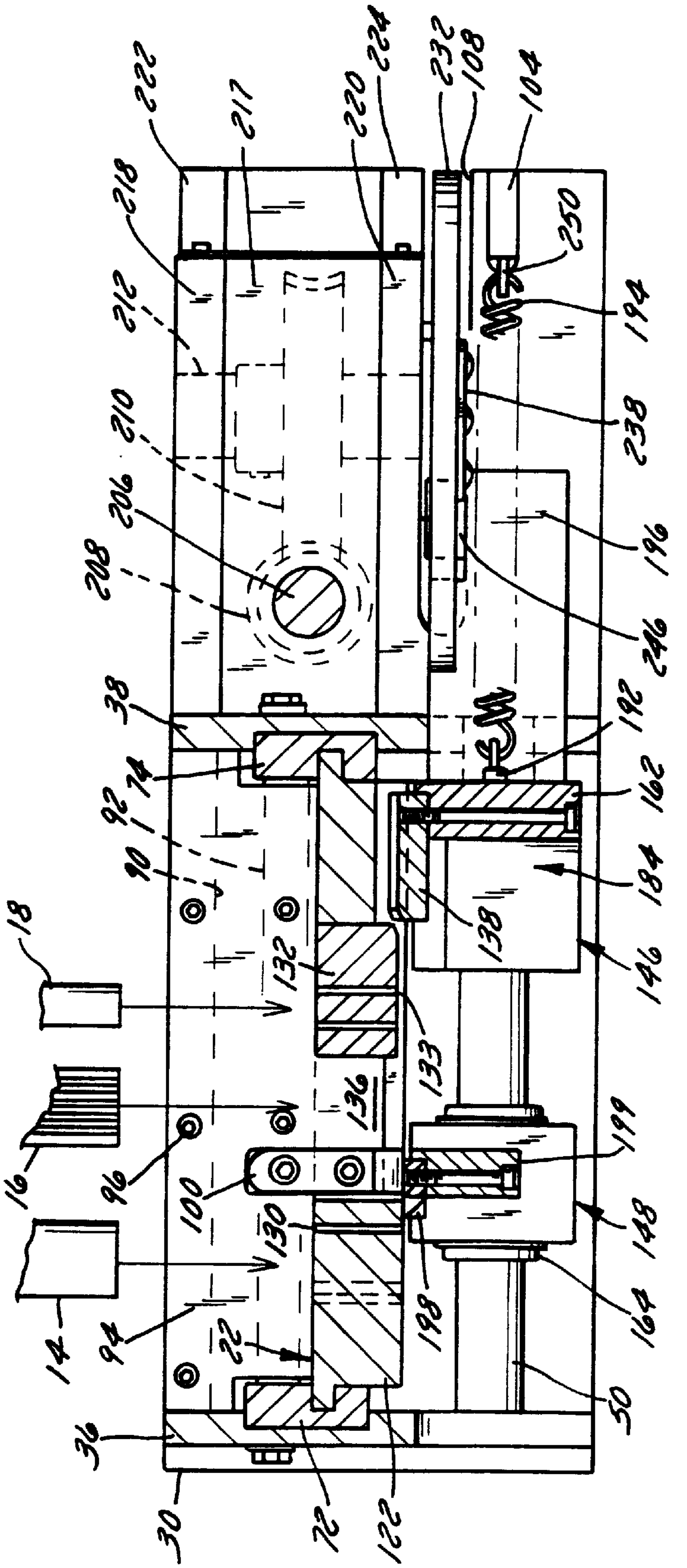
FIG. 18 is a cross-sectional view taken generally along lines 18—18 of FIG. 6.
Figure 19:
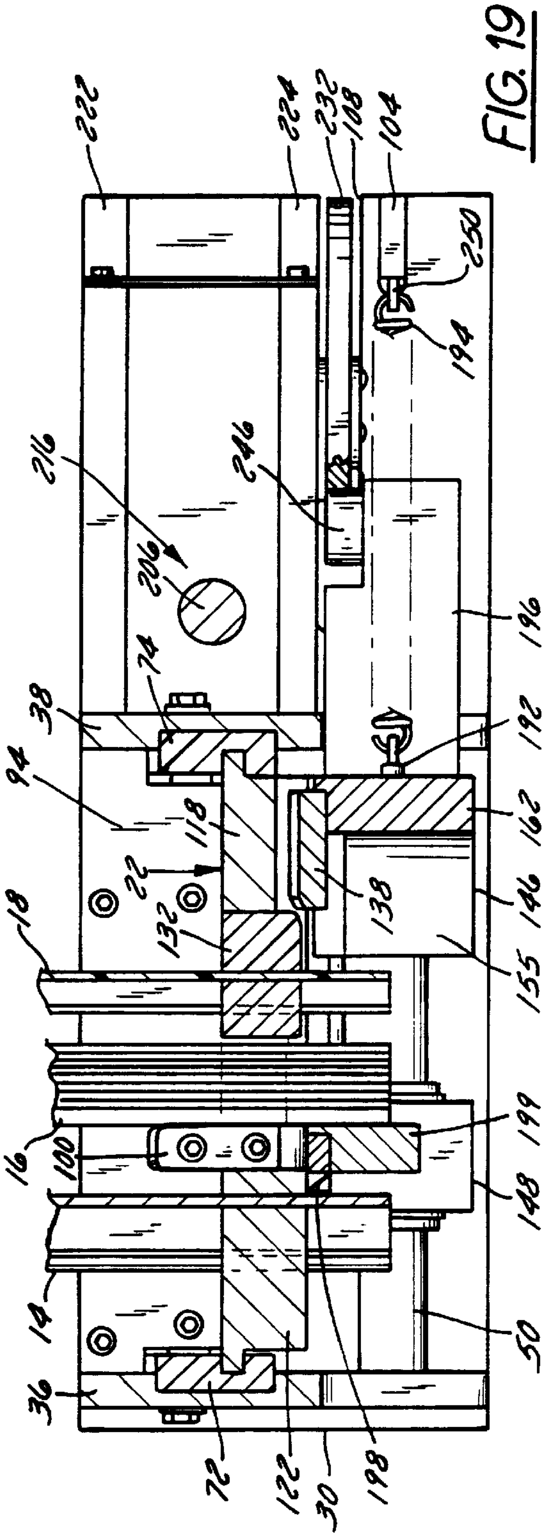
FIG. 19 is a cross-sectional view taken generally along lines 18—18 of FIG. 6 with the headrail, bottom rail and slats in loaded in the cutter.
Figure 20:
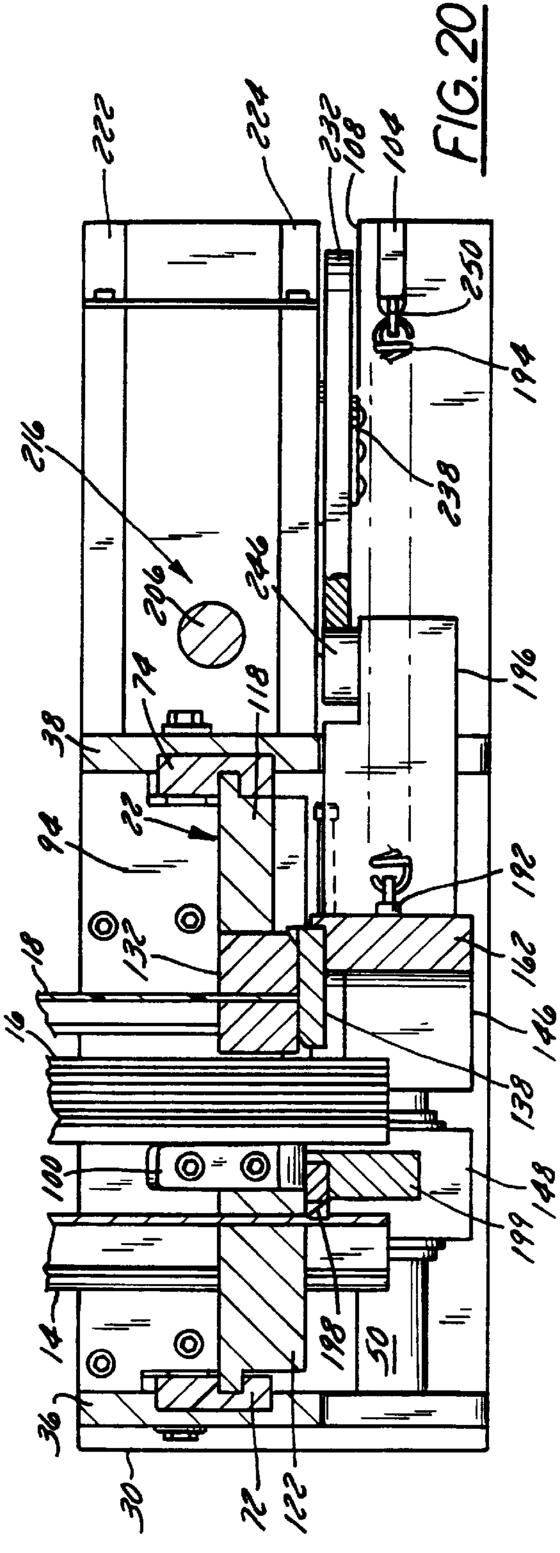
FIG. 20 is a cross-sectional view taken generally along lines 18—18 of FIG. 6 with the slat blade having extended through the bottom rail.

As illustrated in FIGS. 1 and 18 headrail 14 is slid through second slot 130 of headrail die 122. Similarly slats 16 are slid into second receiving area 136 proximate slat shear plate 100. Finally, bottom rail 18 is slid into bottom die slot 133. Headrail 14, slats 16 and bottom rail 18 are positioned such that the portion of each component to be cut extends beyond exit surface **122*f* of headrail die, exit surface of slat shear plate 100 and exit surface 132*c*** respectively.

Once the blind components are loaded into cutter 10 and positioned relative to the exit side of die assembly 22, the operator begins the cut cycle by manually rotating handle assembly 200 in a clockwise direction. Rotation of handle assembly 200 and handle arm 204 specifically occurs in a plane parallel to the base plane. It is also possible to design handle assembly 200 for counter-clockwise rotation. Counter-clockwise rotation of handle assembly 200 may be desirable to allow greater leverage for the right handed operator.

Rotation of handle assembly 200 results in the rotation of shaft 206 and worm 208, which in turn rotates worm gear 210 and output shaft 212, which in turn rotates cam 232 in a clockwise position. The clockwise rotation of cam 232 is defined by viewing cam 232 from the exit side of cutter 10.

In the preferred embodiment, handle assembly 200 is rotated thirty times to complete a single rotation of cam 232. The complete rotation of cam 232 represents one complete cutting cycle of cutter 10. A complete cutting cycle includes translation of blades 138, 198 from a starting position to a fully extended position in which the mini-blind components are cut and return the blades 138, 198 are returned to the starting position.

As cam 232 is rotated, follower 246 is translated toward the front of cutter 10 which results in the forward movement of slat carrier 146. The cam profile is configured such that the rate of forward translation of follower 246 varies for a given rotation of output shaft 212.

In the preferred embodiment, the greatest rate of forward translation of the follower per unit of rotation of the output shaft occurs proximate the starting point A. During this initial stage of the cutting cycle, slat carrier 146 moves from the starting position to a point proximate where blade 138 engages bottom rail 16. The force required to move the slat carrier from the start position to a position proximate bottom rail 18 is less than the force required to cut the components. The mechanical advantage required initially is less than that required during the actual cutting of the components. Accordingly, the rate of translation per degree of rotation is greater for the initial period in which blade carrier 146 moves from the start position to the position in which blade 138 engages bottom rail 18.

Continued translation of slat carrier 146 and blade 138 results in the cutting of bottom rail 18. The curvature of blade 138 as discussed above is preferably flush against the curved surface **132*c* of bottom rail die 132. Once a portion of bottom rail 18 has been cut it exits cutter 10 via chute region 184 of slat carrier 146. Further translation of slat carrier 146 results in the engagement of blade 138 with slats 16. Slats 16 are first forced forward within second opening 136 against slat shear plate 100 thereby removing any slack between the slats 16. The force of blade 138 further minimizes the curvature of slats 16 during the cutting operation. Each slat 16 is then sheared by blade 138 in seriatim and exits cutter 10 through chute 184**.

Figure 21:
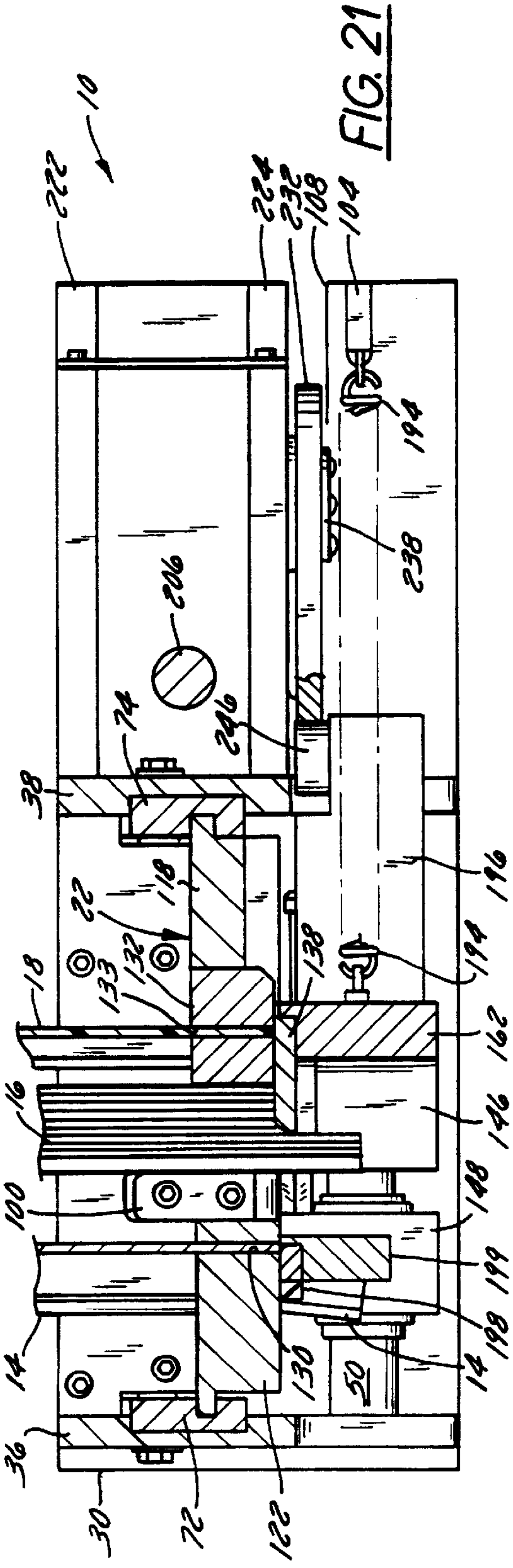
FIG. 21 is a cross-sectional view taken generally along lines 18—18 of FIG. 6 with the slat carrier engaged with the slats and the headrail blade engaged with the head rail.

During the cutting of slats 16 front surface **146*b* of slat carrier 146 abuts spacer 172 and results in forward translation of headrail carrier 148. As a result slat carrier 146 and headrail carrier 148 move forward in unison. As the remainder of uncut slats 16 are cut headrail 14 is cut by blade 198. (See FIG. 21**).

In this manner, drive system 28 provides independent linear translation of the first blade carrier for a pre-determined first distance, and simultaneous linear translation of the first and second blade carriers for a pre-determined second distance. The pre-determined first distance being sufficient to cut the bottom rail and portions of the slats. The pre-determined second distance being sufficient to complete the cutting of the slats and headrail. This approach permits the overall length of cutter 10 along the longitudinal axis to be reduced. It is possible to include a separate third blade carrier, such that a unique blade cuts the three separate components. However this adds additional cost.

Depending on the increased load required by simultaneously cutting the uncut slats and headrail it is possible to alter the cam profile configuration to reduce the rate of translation per unit of rotation of handle assembly 200. The variation in the cam profile allows for a constant input force on behalf of the operator. However, a constant rate of translation can be employed for the entire portion of the cycle in which the blades are engaged with the components.

Figure 22:
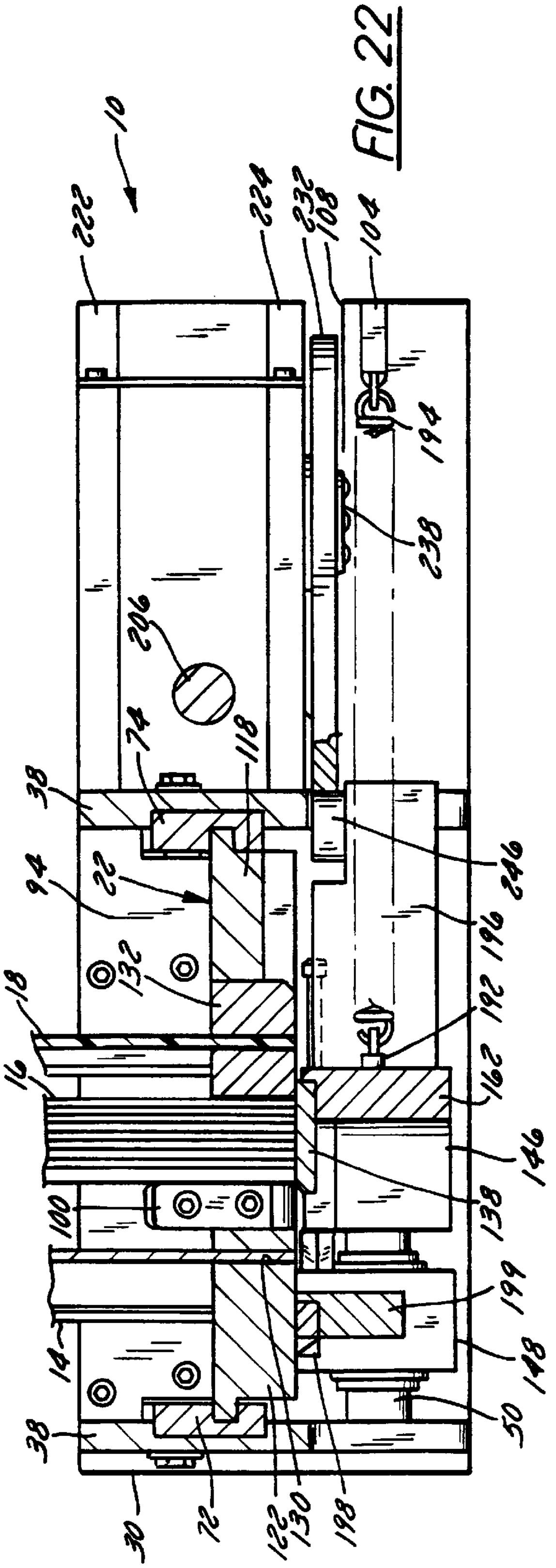
FIG. 22 is a cross-sectional taken generally along lines 18—18 of FIG. 6 with the slat carrier, head rail carrier in the fully extended position.

The carriers 146, 148 are farthest from the starting position or in the fully extended position when follower 246 is adjacent point C on cam 232. At this point head rail 14, slats 16, and bottom rail 18 are fully cut. (See FIGS. 8 and 22). Continued rotation of handle assembly 200, results in the rotation of cam 232 from point C to starting point A. The rate of reduction in radius from point C to point A allows carriers 146, 148 to return quickly to the starting position.

In the preferred embodiment, the return of carriers 146, 148 from the fully extended position to the starting position is accomplished with rotation of approximately 30 to 36 degrees of cam 232. Based upon a thirty to one ratio of rotation of handle assembly 200 to rotation of cam 232, return of the carriers is accomplished with approximately two and one half to three turns of handle assembly 200.

Extension springs 194 are in tension when carriers 146, 148 are in the fully extended position and bias the carriers back to the starting position as cam 232 is rotated from point C to point A. While it would be possible to incorporate a step reduction in the radius from point C to point A this would result in the carriers "slamming" back under the tension of springs 194. The sloped non-step reduction in the radius allows for a smoother return of carriers 146, 148.

Turning to the operation of cutter 10 in the first mode of operation, die assembly 22 is moved to the first or lower position such that first slot 130 of headrail die 122 and first opening 134 are located adjacent shelf plate 94. (See FIG. 9).

Similar to the process described above for sizing the mini-blind product having the second configuration, the mini-blind having the first configuration is loaded into blind cutter from the left or loading side of cutter 10. (See FIG. 18).

While, the headrail of the first configuration is slid through first slot 128 in the manner described above for the headrail of the second embodiment, the slats and bottom rail 18 of the first configuration are slid into first opening region 134. Although a separate die is not used in the preferred embodiment for cutting the vinyl bottom rail, a die could be used to cut the bottom rail of the first configuration as well. The use of bottom die 132 for cutting the steel bottom rail increases the dimensional integrity of the bottom rail during the cutting process.

As described above with respect to the second configuration, the headrail, slats and bottom rail of the first position are positioned such that the portions to be cut extend beyond the exit surface of headrail die 122, slat shear plate 100, and bottom rail die 132.

The cutting operation is substantially similar to that described above with the noted exception that slats are forced against shear plate 100 initially upon contact of bottom rail by blade 138.

Figure 23:
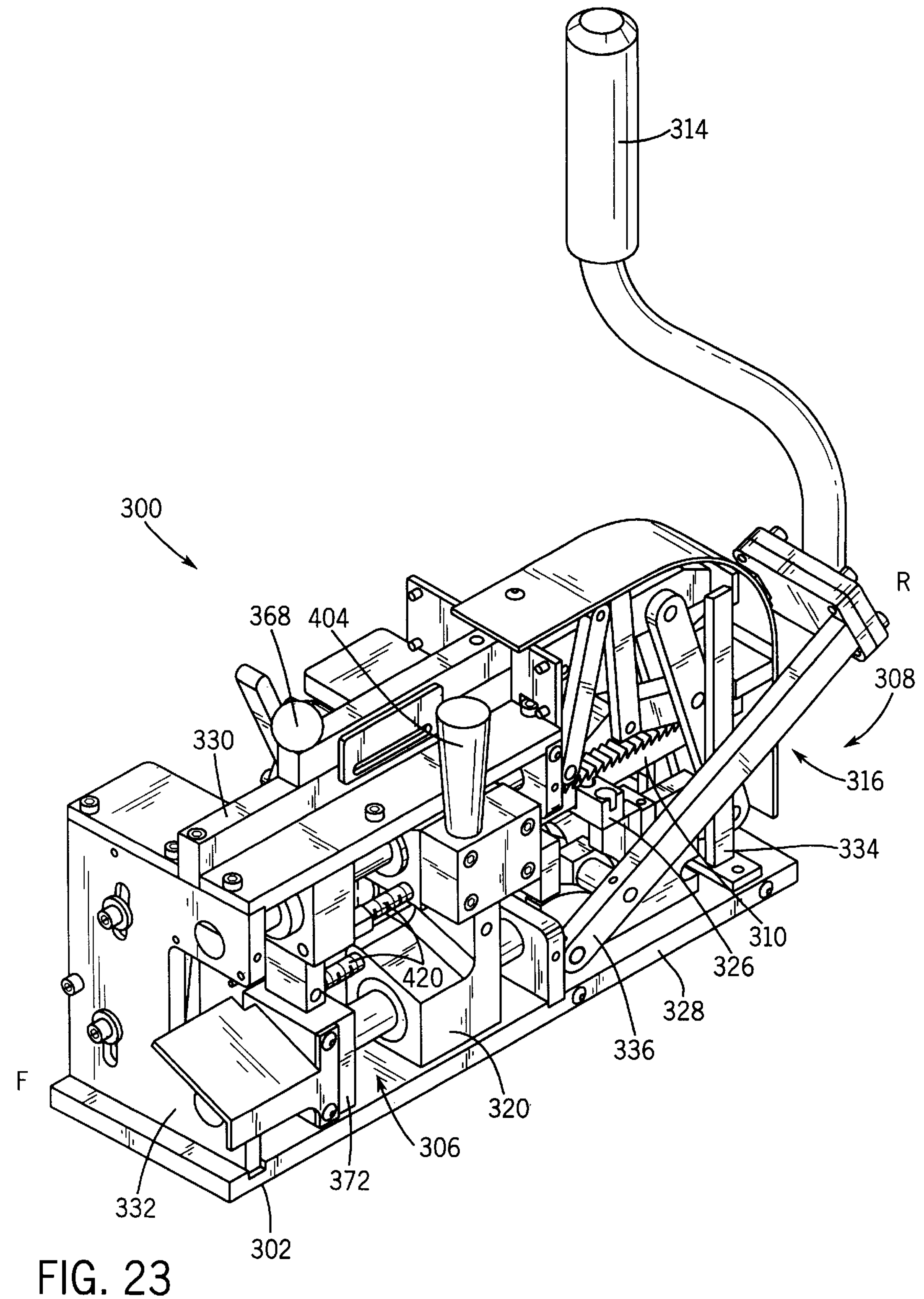
FIG. 23 is a perspective view of the right or exit side of a second embodiment of the mini-blind cutter.

Referring now to FIG. 23 a second preferred cutter mechanism 300 will be described. Cutter 300 is similar to cutter 10 in a number of respects. First, cutter 300 includes a frame 302 similar to frame 20 of cutter 10. Accordingly, every element of frame 302 will not be described again. However, the differences between frame 302 and frame 20 will be outlined below as required to support the description of the various modified systems. For example, since cutter 300 includes a different drive system, frame 302 does not include a spring tower. Components that are similar in both cutter 10 and cutter 300 will be identified with a separate reference numeral for clarity.

Similarly, cutter 300 includes a die assembly 304 that is similar to die assembly 22 of cutter 10, and a blade carrier assembly 306 and supporting structure similar to carrier assembly 24. The differences in these systems and assemblies will be described below as required.

As discussed above with respect to cutter 10, cutter 300 may be used to cut two different mini-blind configurations, in two different modes of operation. The first mode of operation involves sizing a mini-blind having a vinyl head rail, vinyl bottom rail and either aluminum or vinyl slats. This mini-blind configuration will be referred to as the vinyl blind. The second mode of operation involves sizing a mini-blind having a steel head rail and bottom rail and aluminum slats. This mini-blind configuration will be referred to as the aluminum blind. Of course other materials and combinations could also be sized.

The framework or frame 302 supports the movable die assembly 304 that works in cooperation with the carrier assembly 306. Die assembly 304 is movable from a first or lowered position to cut a mini-blind having the first configuration (vinyl blind) to a second or raised position to cut a mini-blind having the second configuration (aluminum blind).

Referring to FIGS. 23–26, cutter 300 includes a drive assembly 308 having a rack and pawl mechanism. The rack 310 is driven forward by a driving pawl 312 coupled to an actuation handle 314 by means of a four bar linkage 316. The rack 310 is attached to the rear side 318 of a rear blade carrier 320, such that translation of the rack 310 results in translation of the rear blade carrier 320.

A roller 322 supported in a drive cradle 324 supports the rack 310 as it drives the rear blade carrier 320 forward. Additionally, the rack 310 is supported laterally by a pair of supports 326 secured to the drive cradle 324 and positioned on opposite sides of the rack 310. The drive cradle 324 is secured to the base plate 328 of the frame 302. The drive assembly is further includes a top bar 330 supported by the front plate 332 of the frame 302 and a rear support member 334 extending from the base plate 328 at the rear (R) of the cutter 300. The base plate 328 and the top bar 330 of the frame 302 are fixed relative to one another and serve as the ground of the four bar linkage 316.

As illustrated in FIGS. 23–26, the handle 314 is secured to the four bar linkage 316 at a first link 336. The first link 336 is pivotally attached to the drive cradle 324 at a first pivot 338. A second link 340 is pivotally attached to the first link 336 at a second pivot 342 a predetermined distance from the first pivot 338. The second link 340 in turn is pivotally attached to a third link 344 at a third pivot 346. The third link 344 is pivotally attached to the top bar 330 at a fourth pivot 348. In this manner the four bar linkage 316 is completed. The driving pawl 312 is pivotally attached to the third link 344 at a fifth pivot 352. Movement of the handle 314 toward the front (F) of the cutter 300 results in forward movement of the driving pawl 312 which in turn engages and drives the rack 310 and rear blade carrier 320 forward.

The driving pawl 312 includes a driving pawl release bar 354 attached thereto. The release bar 354 extends from the driving pawl 312 to a point above the top bar 330. Rearward movement of the driving pawl release bar 354 pivots the driving pawl 312 about the fifth pivot 352 thereby disengaging the teeth of the driving pawl 312 from the rack 310.

The driving mechanism further includes a holding pawl 356 to prevent the rack 310 from moving rearward during the cutting of the blind components. An extension bar 358 is secured to and extends downward from the top bar 330. The holding pawl 356 is pivotally attached to the extension bar 358 at a sixth pivot 360. A holding pawl release bar 362 extends from the holding pawl 356 to a point above the top bar 330. Similar to the release bar 354 of the driving pawl 312, movement of the holding pawl release bar 362 toward the rear of the cutter disengages the holding pawl 356 from the rack 310 thereby permitting the rack 310 to be moved rearward.

A cutter engagement/release switch 364 is slidably attached to the top bar 330. The switch 364 includes a first end 366 having a knob 368 attached thereto, and a second opposing end 370. Movement of the knob 368 in a direction rearward, causes the second end 370 of the switch 364 to contact and push rearward the holding pawl release bar 362. Continued movement of the switch 364, results in the holding pawl release bar 362 which in turn contacts the driving pawl release bar 354 thereby releasing the driving pawl 312. In this manner the switch 364 can be moved rearward to release the driving and holding pawls 312, 356 from the rack 310. Once the driving and holding pawls 312, 356 have been released from the rack 310, the rack 310 may be manually moved rearward or forward.

Similarly, movement of the switch 364 toward the front of the cutter, results in the engagement of the driving and holding pawls 312, 356 with the rack 310. While the switch 364 does not directly pull the driving and holding pawls 312, 356 into engagement with the rack 310, the driving and holding pawls 312, 356 are pivotally attached to the four bar linkage 316 and top bar 330 respectively such that gravity acts to pivot the pawls into engagement with the rack 310.

Figure 24:
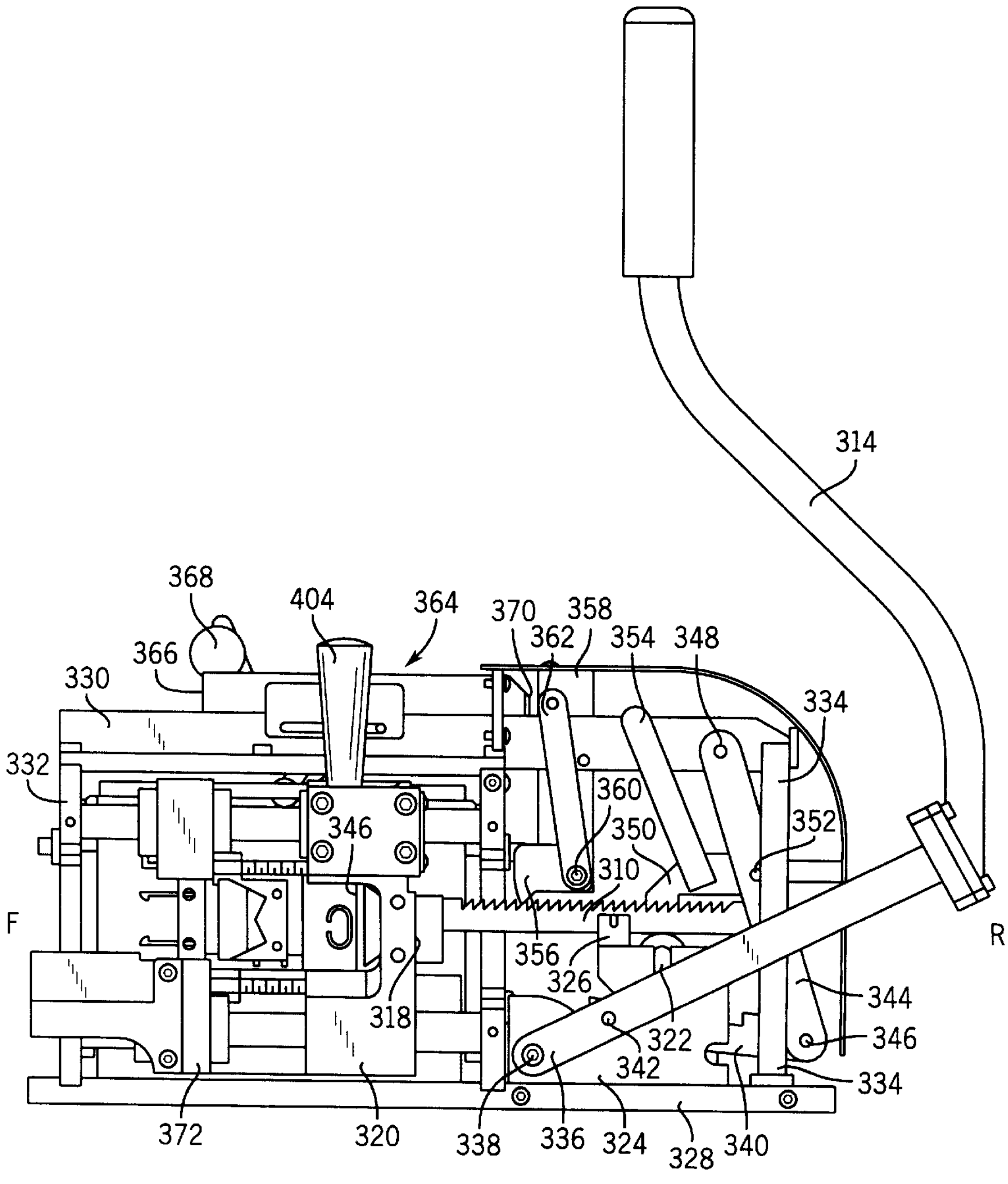
FIG. 24 is a plan view of the right side of the mini-blind cutter of FIG. 23.
Figure 25:
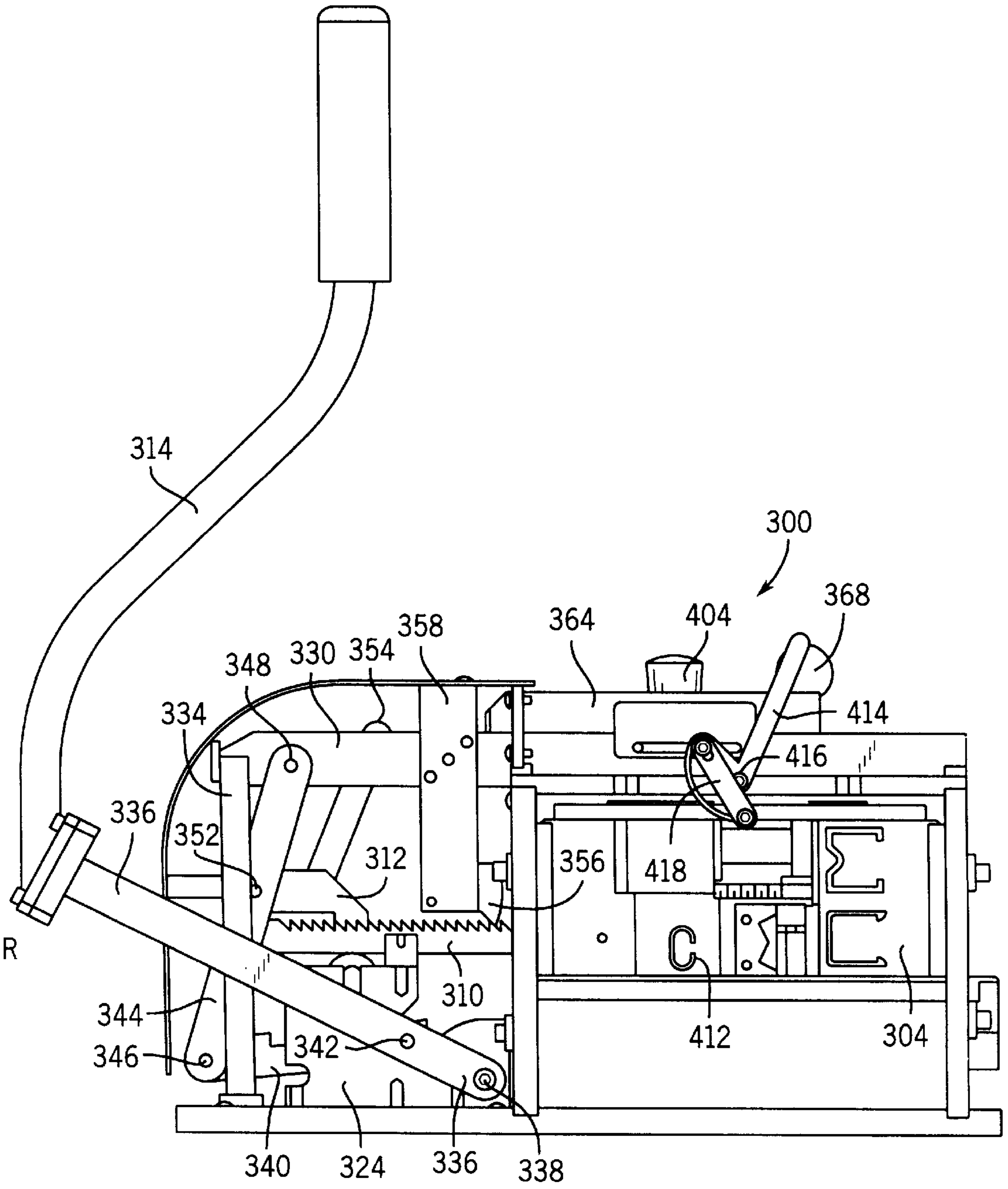
FIG. 25 is a plan view of the left side of the mini-blind cutter of FIG. 23.
Figure 26:
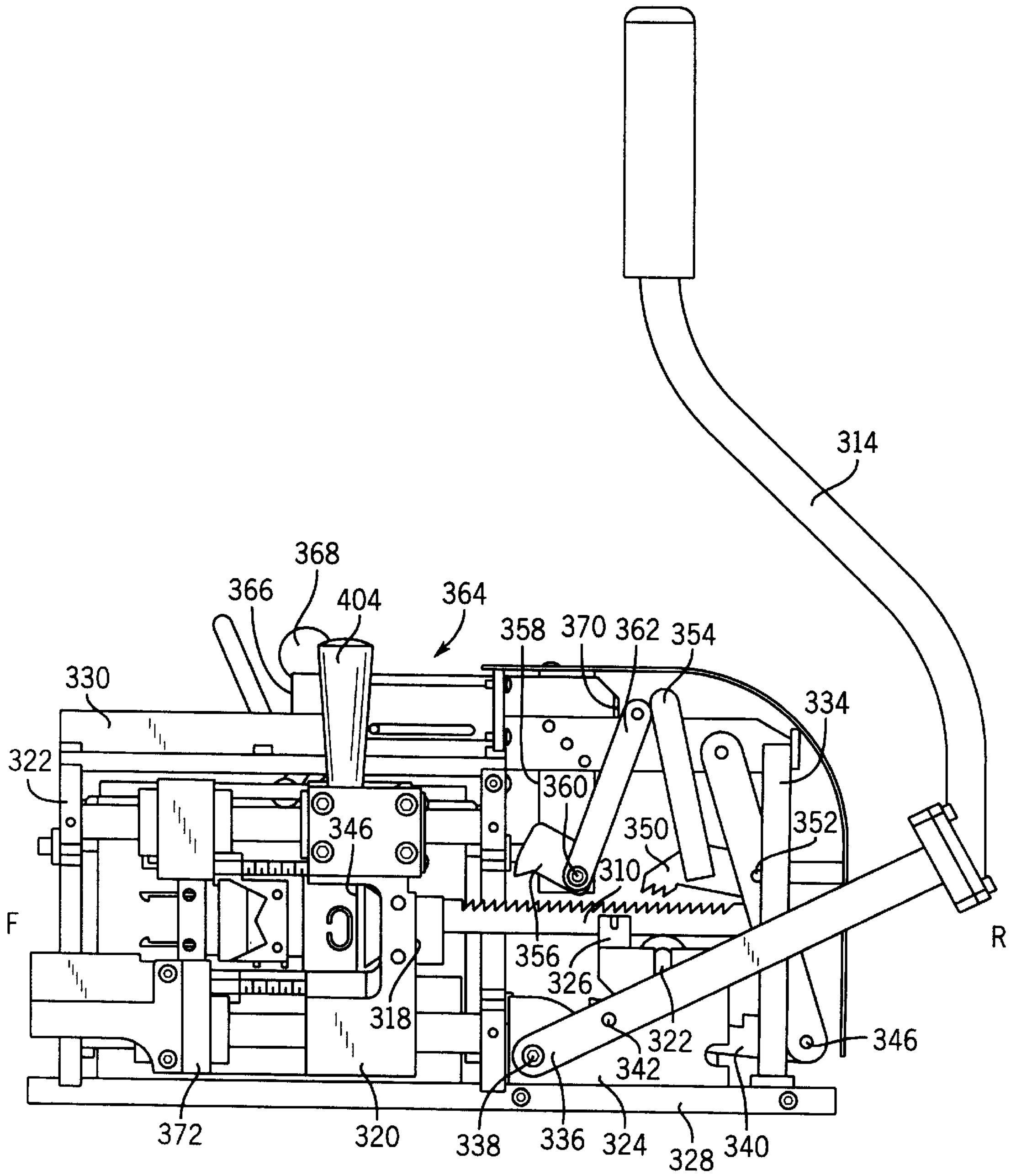
FIG. 26 is a plan view of the right side of the mini-blind cutter of FIG. 23 with the pawls disengaged from the rack.
Figure 27:
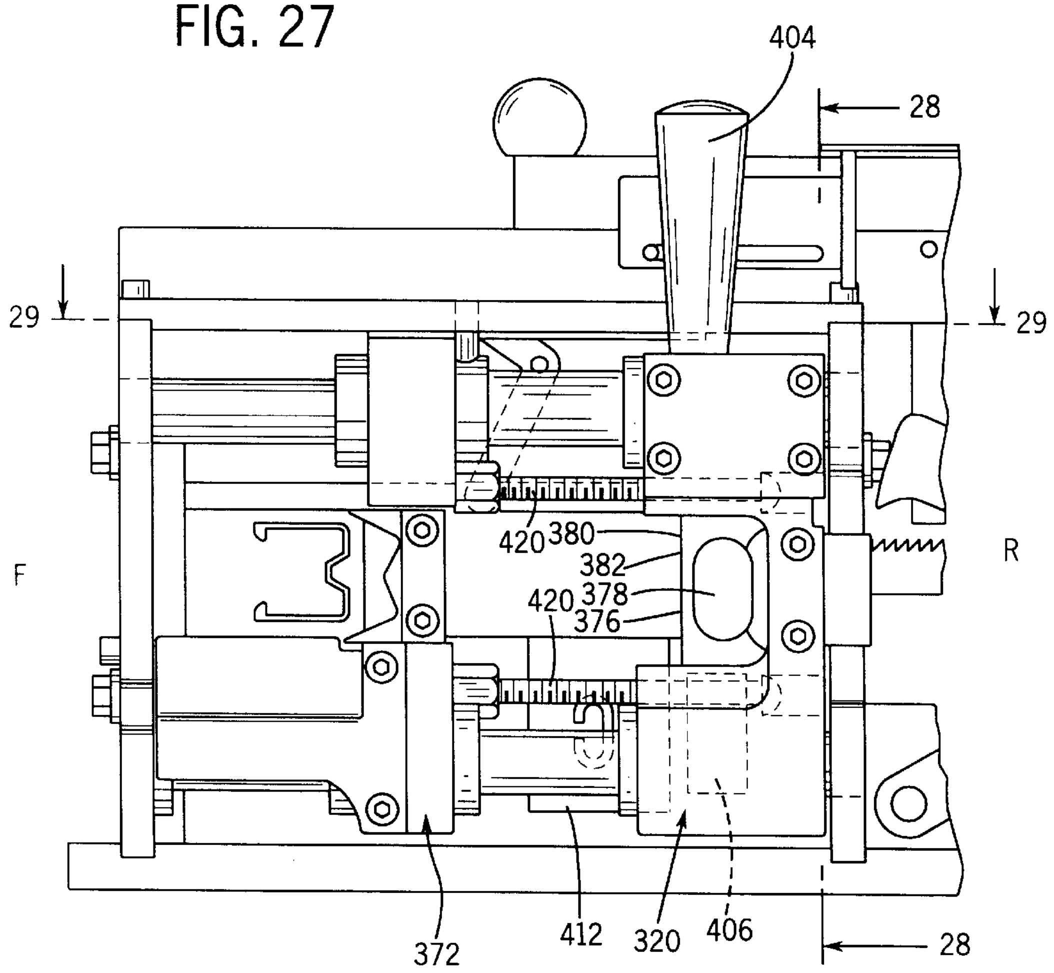
FIG. 27 is a partial plan view of the right side of the mini-blind cutter of FIG. 23 with the die assembly in the first position.
Figure 28:
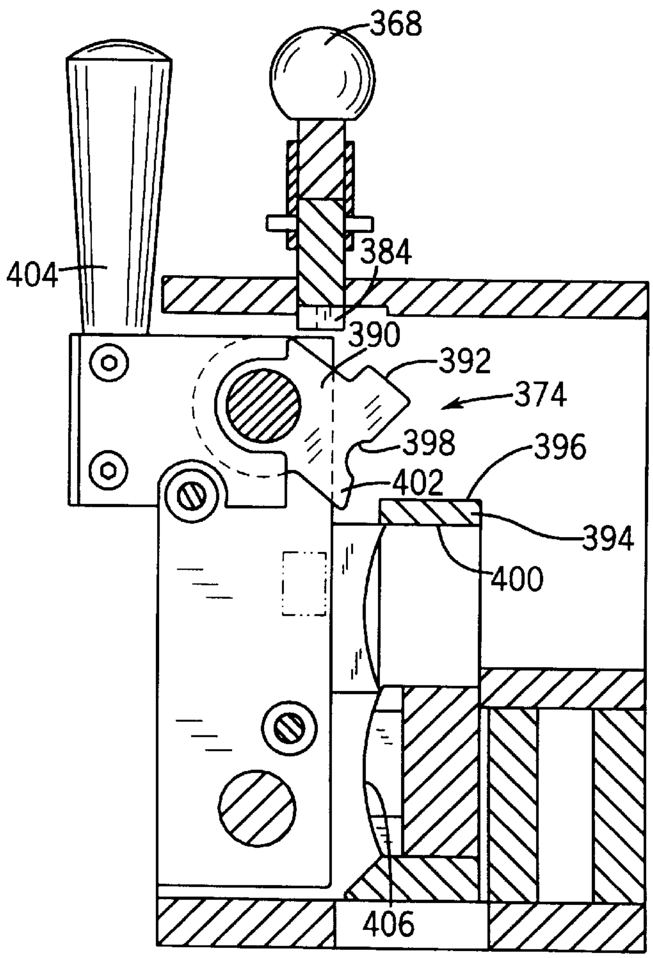
FIG. 28 is cross-sectional view taken generally along line 28—28 of FIG. 27.

Referring to FIGS. 24 and 28 the blade carrier assembly 306 includes a head rail blade carrier 372, a bottom rail blade carrier 320, and a latch mechanism 374 for coupling the head rail blade carrier 372 and bottom rail blade carrier 320 together. The bottom rail blade carrier 320 includes a blade member 376 (see FIG. 27) having a first opening 378 for receiving a metal bottom rail of the second configuration as outlined above. The first opening 378 has a predetermined profile similar to the outer shape of the metal bottom rail. The front edge 380 of the blade member 376 includes an arcuate blade portion 382 for cutting the slats independently of the metal bottom rail in the second mode of operation. The front edge 380 of the blade 376 is also employed for cutting both the bottom rail and slats of the vinyl blind in the first mode of operation.

Figure 29:
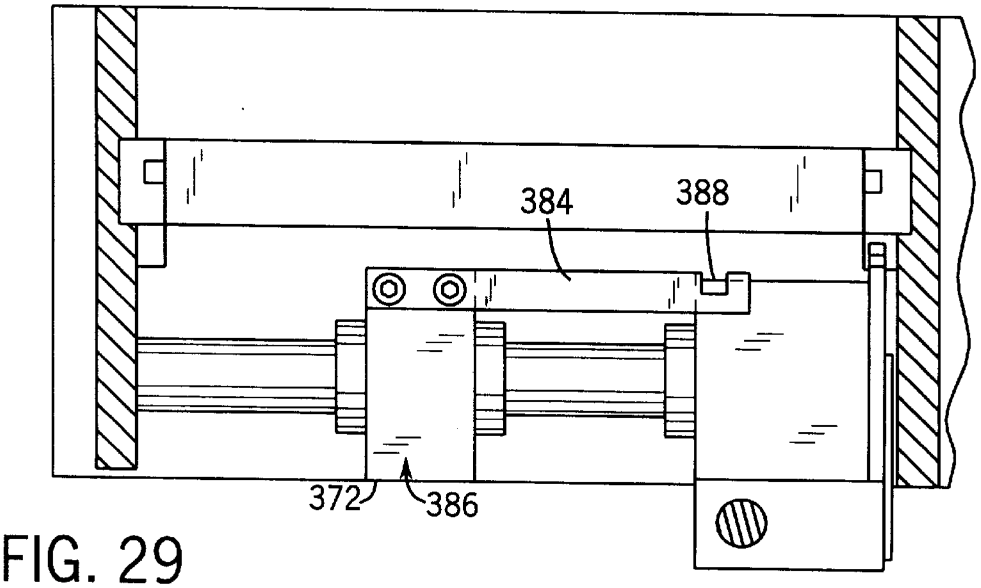
FIG. 29 is cross-sectional view taken generally along line 29—29 of FIG. 27.
Figure 30:
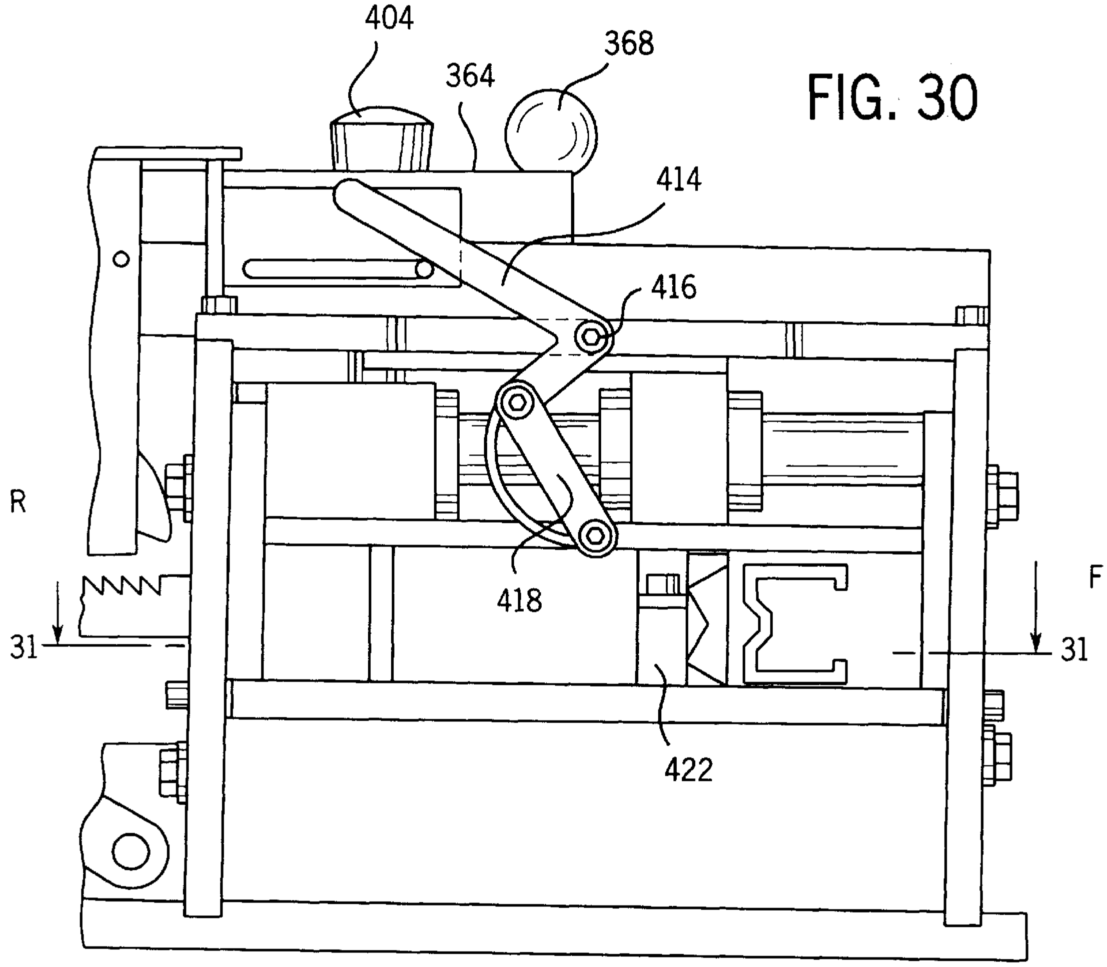
FIG. 30 is a partial plan view of the left side of the mini-blind cutter of FIG. 23 with the die assembly in the first position.
Figure 31:
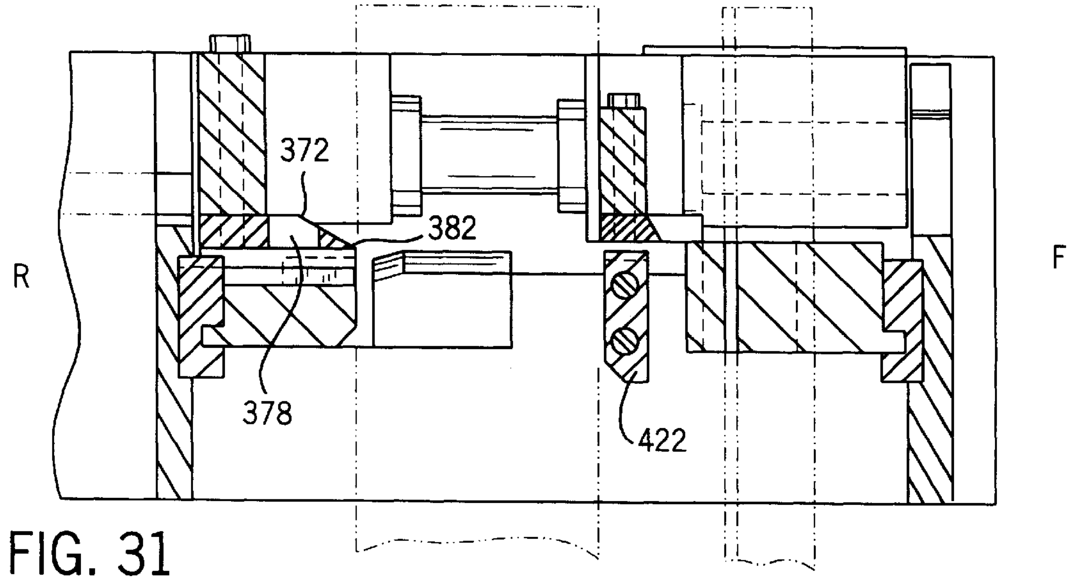
FIG. 31 is cross-sectional view taken generally along line 31—31 of FIG. 30.
Figure 32:
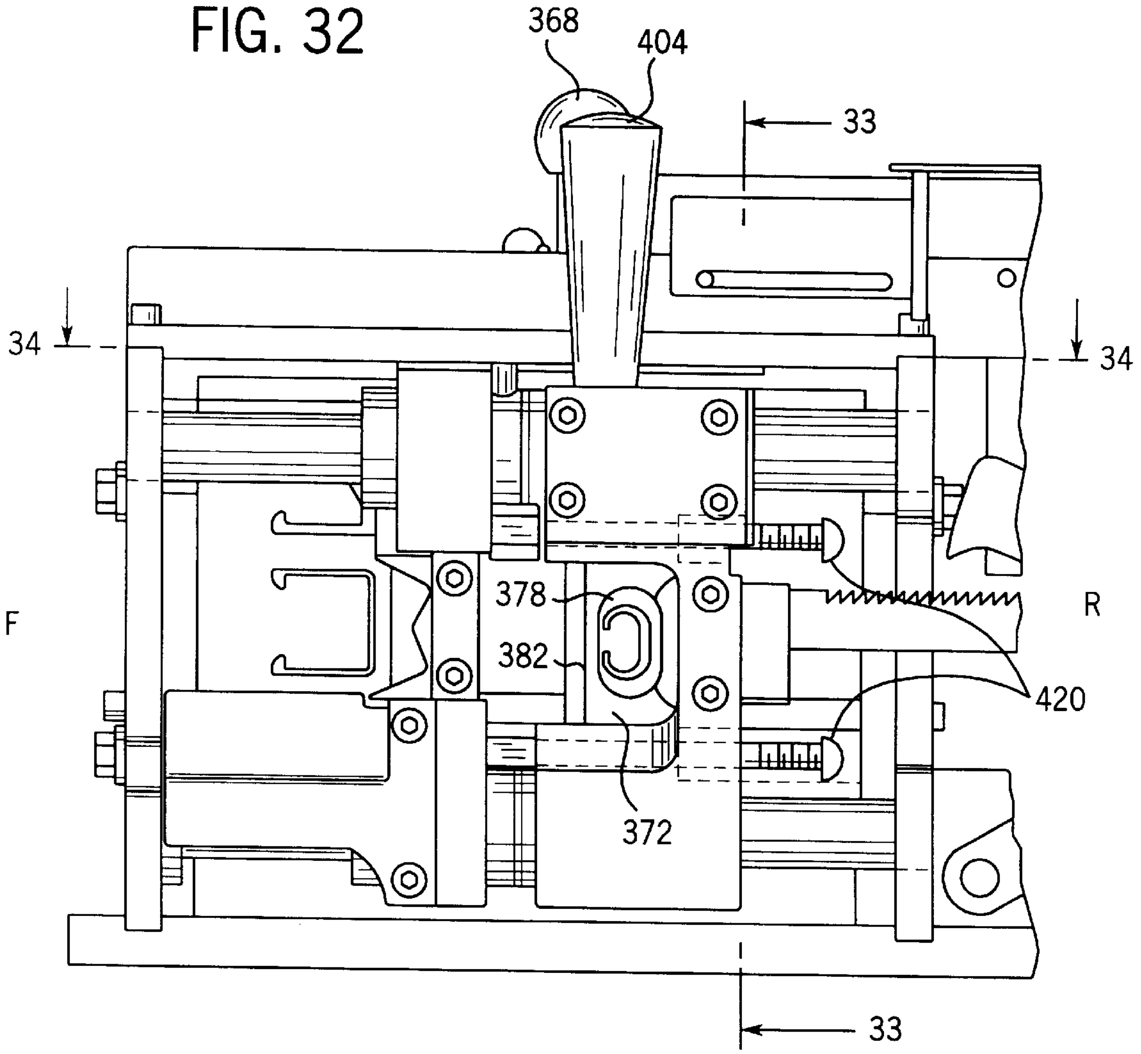
FIG. 32 is a partial plan view of the right side of the mini-blind cutter of FIG. 23 with the die assembly in the second position.

Referring to FIGS. 28 and 29, a latch 384 is secured to the top 386 of the head rail blade carrier 372 and extends rearward. The latch 384 includes a notch 388 proximate the rearward end. The bottom rail blade carrier 320 includes a pivotal catch 390 that can be rotated from a first disengaged position (see FIG. 28) to a second engaged position (see FIG. 33). The catch 390 includes a tab portion 392 that is received within the notch 388 when the catch 390 is in the first position. When the head rail and bottom rail blade carriers are adjacent one another and the die assembly is raised to the second position, movement of the catch 390 to the second position engages the tab 392 within the notch 388, thereby coupling the two blade carriers together.

Similarly, when the catch 390 is pivoted to the first position, the tab 392 is disengaged from the notch 388 and the blade carriers are free to move independent of one another. Of course the movement of the blade carriers are still linked through the connectors as described above with respect to cutter 10.

The catch 390 is automatically pivoted by engagement of the top plate 394 of the die assembly 304 as the die is moved to or from the first position. When the die assembly 304 is raised from its first or lower position to its second or upper position, the upper surface 396 of the top plate 394 of the die assembly contacts the underside 398 of the tab 392 thereby rotating the catch 390 such that the tab 392 is located within the notch 388. In this manner, the head rail and bottom rail blade carriers are coupled together.

Similarly, when the die assembly 304 is moved from the upper or second position to the first or lower position, the under side 400 of the top plate 394 engages an extension portion 402 on the catch 390 thereby pivoting the catch 390 to the disengaged position.

Additionally, the bottom rail blade carrier 320 includes a handle 404 for manually moving the blade carriers either to a first fully extended position to receive the components of a blind to be sized or to a second retracted position in which the blades have moved past the corresponding die portions toward the front plate 332.

Die assembly 304 includes a safety block 406 attached to the exit side of the support side plate 408 of the die assembly. In this manner the safety block is proximate the carrier assembly 306. The safety block 406 prohibits the die assembly 304 from being moved from the lower position to the upper position, when the bottom rail blade carrier 320 is in the fully extended position. This prevents the bottom rail blade member 376 from being damaged by ensuring that the bottom rail die block 410 does not hit the cutting edge 380 of the bottom rail blade as the die 304 is being raised. The safety block 406 is positioned such that if a user attempts to move the die assembly 304 when the bottom rail blade carrier 320 is in the extended position, the safety block 406 safely contacts the under side of the bottom rail blade member 376 where no damage to the cutting blade 380 can occur.

The operation of the cutter 300 will now be described, including the steps required to operate the cutter 300 in both the first and second mode of operation.

The first step required to use cutter 300 is to move the die assembly 304 to the first or second position depending on the blind configuration to be sized. Movement of the die assembly 304 is accomplished by pushing the switch 364 in a rearward direction thereby disengaging the driving and holding pawls 312, 356 from the rack 310. With the rack 310 free to move, the handle 404 attached to the rear blade carrier 320 is manually pulled in a forward direction until the blade member 376 of the rear blade carrier 320 clears both the safety block 406 and the bottom rail die block 412.

With the rear blade carrier 320 clear of the safety block 406 and bottom rail die block 412, the die assembly 304 can be either raised or lowered by activation of a lever 414 pivotally attached to the top plate of the frame at a pivot 416. The lever 414 in turn is pivotally attached to a spring biased link 418 that retains the lever 414 in a first or second position representing the lower and upper positions of the die assembly 304. In the embodiment disclosed in the figures, when the lever 414 is pivoted toward the rear of the cutter, the die assembly 304 is lowered to the first die position. Similarly when the lever 414 is pivoted toward the front of the cutter 300, the die assembly 304 is raised to the second position.

Figure 33:
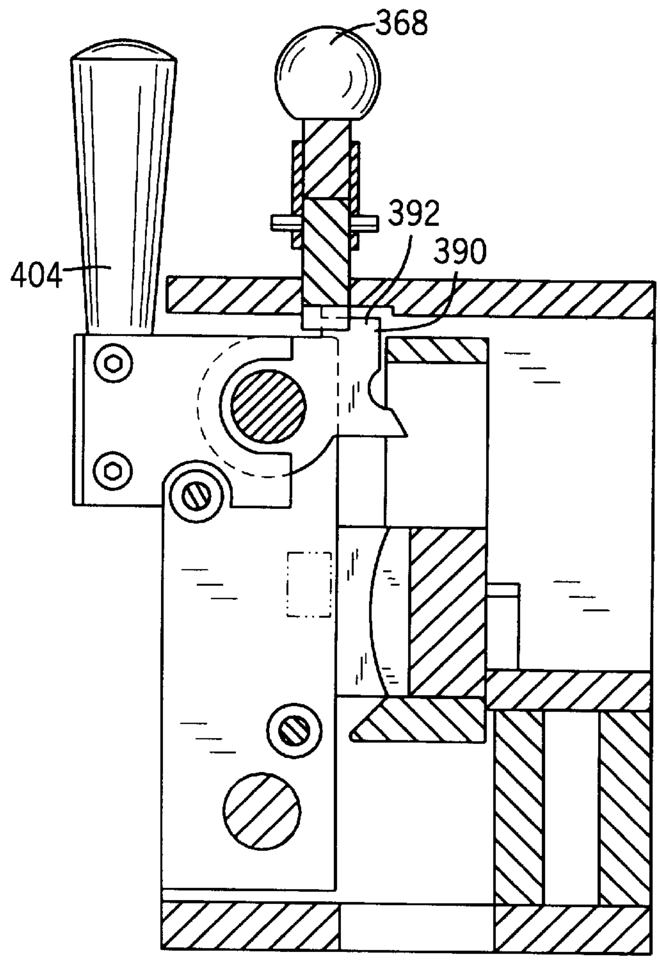
FIG. 33 is cross-sectional view taken generally along line 33—33 of FIG. 32.
Figure 34:
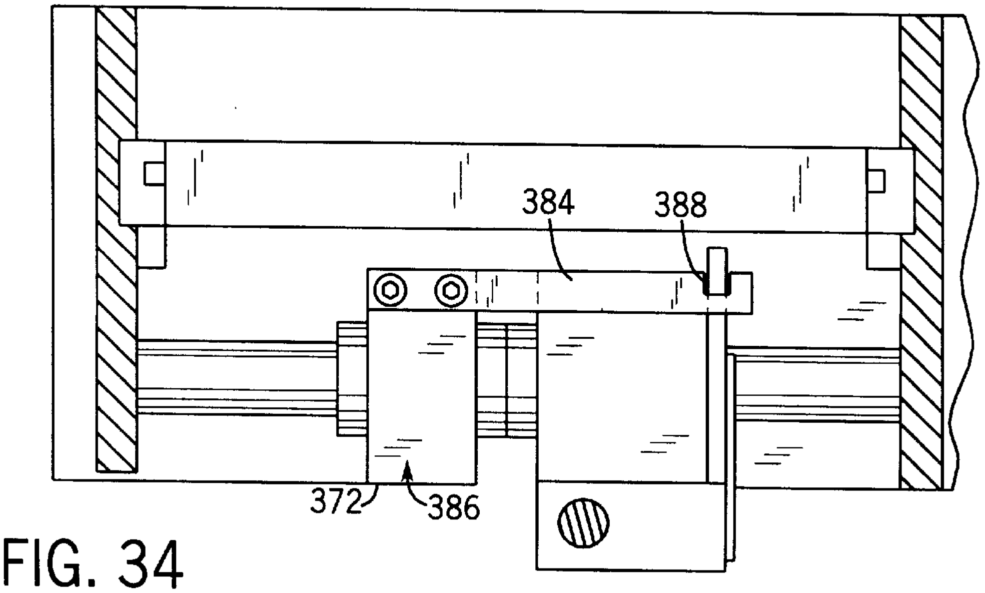
FIG. 34 is cross-sectional view taken generally along line 34—34 of FIG. 32.
Figure 35:
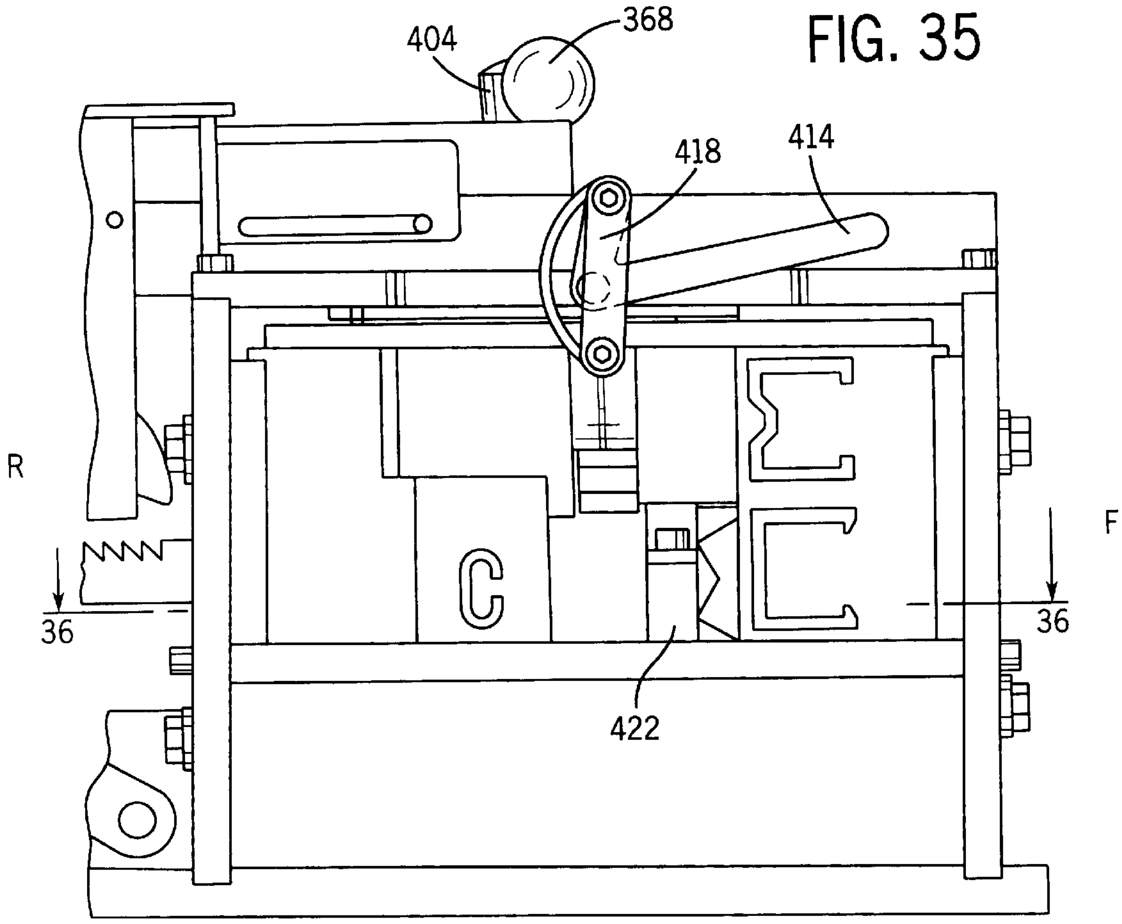
FIG. 35 is a partial plan view of the left side of the mini-blind cutter of FIG. 23 with the die assembly in the second position.
Figure 36:
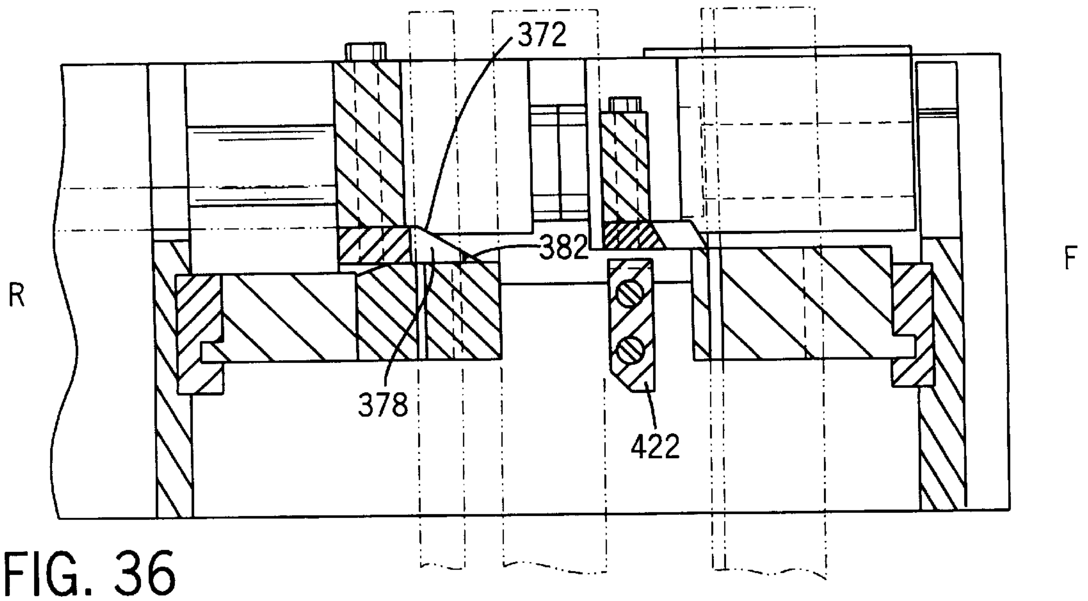
FIG. 36 is cross-sectional view taken generally along line 35—35 of FIG. 35.

FIGS. 27–31 illustrate the die assembly 304 in the lower position, while FIGS. 32–36 illustrate the die assembly 304 in the raised position. As discussed above, the raising and lowering of the die assembly 304 engages or disengages respectively the tab 392 within the notch 388. As shown in FIGS. 28 and 29 the tab 392 is disengaged from the notch 388 when the die assembly 304 is in the first or lower position. In contrast, FIGS. 33 and 34 illustrate the tab 392 engaged with the notch 388 when the die assembly 304 is in the second or raised position.

The sizing of a vinyl blind will be described first. The die assembly 304 is moved to the first or lower position as discussed above. Once the die assembly 304 has been lowered, the rear die assembly 304 is manually moved rearward utilizing the rear blade carrier handle 404. Since, the rear blade carrier 320 and the front blade carrier 372 are not coupled with the tab and notch 388, the rear blade carrier 320 will travel a predetermined distance independently of the front blade carrier 372. Connecting rods 420 operate as connecting rods 166 in cutter 10 described above, such that once the rear blade carrier 320 has traveled rearward a predetermined distance, the connecting rods 420 act to move the front and rear blade carriers 320, 372 rearward together beyond the predetermined distance.

Once the rear blade carrier 320 has been fully extended rearward, the bottom rail, slats and head rail of the vinyl blind are placed within the die assembly as described above with respect to cutter 10. The rear blade carrier 320 may then be moved forward via the rear carrier handle 404 until the rail and slats are pressed against the slat shear plate 422. In this manner the bottom rail and slats are located securely between the blade member and the slat shear plate 422. Since cutter 300 may be used to size a mini-blind having a variety of number of slats, movement of the rear blade carrier 320 acts to take up excess space between the blade member 376 and the slat shear plate 422.

Once, the bottom rail and slats are secured, the switch 364 is then moved forwardly to disengage the end of switch from the holding and driving pawl release bars 362, 354. In this manner the holding and driving pawls 356, 350 are engaged with the rack 310.

The handle 314 is then moved in a forward direction via pivot 338, resulting in forward translation of the driving pawl 350 via the four bar linkage 316. The handle 314 can only move as far forward as the first link 336 will permit. After the handle 314 has traveled as far as it can, the handle 314 is rotated back to its starting position, and as a result the driving pawl 350 is also returned rearwards. Of course an operator need not pivot the handle as far as it can before returning it rearwards. The angle of the teeth in the rack and the driving pawl, permit the driving pawl 350 to move rearward independently of the rack 310. However, due to the pressure that builds up in the bottom rail, slats being cut, the holding pawl 356 is required to prevent the rack 210 from moving in a rearward direction while the driving pawl 350 is returned rearwards.

The handle 314 is pivoted forward and back until the bottom rail, slats and head rail are sized. As discussed above with respect to cutter 10 after a predetermined distance, the rear blade carrier 320 and the head rail blade carrier 372 move together thereby sizing the remaining uncut components.

Once all of the components have been sized, the rear blade carrier 320 and the front blade carrier 372 are in the forward position. Accordingly, the die assembly 304 can be raised for cutting the second blind configuration. Raising the die assembly 304 automatically pivots the catch 390 such that the tab 392 is engaged within the notch 388. (See FIGS. 33 and 34).

After the die assembly 304 has been raised, the switch 364 is moved rearward to release the driving and holding pawls 350, 356 as discussed above. The rear blind carrier 320 and the front blind carrier 372 are moved manually rearward via the rear blind carrier handle 404. Since the rear blade carrier 320 and the front blade carrier 372 are coupled with the catch 390 and latch 384 they move together. A stop located on the frame positively locates the blade carriers relative to the die assembly.

Unlike cutter 10, the bottom rail of the aluminum blind is located within the aperture 378 of the blade member 372, and the slats are located between the cutting surface 382 and the shear slat plate. In this manner, the bottom rail is sized by the rear edge of the aperture, or a third blade in a shearing motion while the slats are sized by the cutting surface 382 of the blade member.

Once the aluminum blind components have been located within the die assembly and blade carriers, the switch 364 is moved forward to permit engagement of the driving and holding pawls 350, 356 with the rack 310. Similar to the sizing of the vinyl blind, the handle 314 is pivoted forward and back a number of times to size the bottom rail, slats and head rail.

Cutter 300 provides a method for cutting two different blind products on the same piece of equipment, utilizing the same drive system. As discussed above, cutter 300 accommodates two mini-blind products of different geometry and or different material composition. Additionally, the number of slats may also vary for a given blind type. Since the vinyl slats are thicker than an aluminum slat, the region of the die assembly 304 to receive the vinyl slats must be wider than the region to receive a similar number of aluminum slats.

Additionally, the rear blade carrier 320 must be able to move further rearward in the extended direction in order to accommodate the greater thickness of the vinyl slats. In the preferred embodiment of cutter 300 the front edge 380 of the blade member 376 also is used to size the vinyl bottom rail. Accordingly, the rear blade carrier 320 must move further rearward than when the metal bottom rail of the aluminum blind is located within the aperture 378 of the blade member 376.

The cooperation of the drive system 308 and blade carrier assembly 306 permits the rear blade carrier 320 to move to two different extended positions for sizing the first vinyl blind product and for sizing the second metal blind product. As discussed above the rear blade carrier 320 is moved further rearward for the sizing the vinyl product, since the front edge 380 of the rear blade member 376 cuts both the bottom rail and slats. Additionally, the width of the compressed vinyl slats is greater than compressed aluminum slats.

The location of the front blade carrier 372 in the extended position is the same for both the first and second modes of operation. However, in the first mode of operation for sizing the vinyl blind, the location of the rear blade carrier 320 is set by the connecting rods 420 while, in the second mode of operation for sizing the aluminum blind, the rear blade carrier 320 is set by the catch 390 and latch 384. The connecting rods 420 permit independent travel of the rear blade carrier 320, while the catch 390 and latch 384 allow for simultaneous translation throughout the translation of the blade carriers.

The first region of the die assembly 304 may also include a bottom rail die block (not shown), such that the portion of the bottom rail of the vinyl mini-blind would be located within the opening in the rear blade member. However, in order to accommodate the thickness of the vinyl slats the rear blade carrier 320 would be located further rearward in the extended position.

Although the invention has been described in conjunction with specific embodiments thereof, it is evident that alternatives, modifications and variations will be apparent to those skilled in the art. It is intended that the claims embrace all such alternatives, modifications and variations that fall within the spirit and broad scope of the appended claims.

What is claimed is:

1. A blind cutter for in-store sizing a mini-blind product including a head rail, a plurality of slats, and a bottom rail, the blind cutter comprising:

a framework;

a die assembly coupled to the framework having a region for receiving a portion of each of the head rail, plurality of slats, and bottom rail;

a blade carrier assembly attached to the framework, the blade carrier assembly including at least one blade carrier movable from a first extended position in which the mini-blind product is loaded into the blind cutter for sizing and a second retracted position in which the mini-blind product has been sized; and a drive system being connected to the framework and blade carrier assembly to provide linear translation of the at least one blade carrier to size the mini-blind product, the drive system including a driving pawl and track;

the drive system including a switch for releasing the driving pawl from the track to permit manual movement of the first blade carrier from the retracted to the extended position;

the die assembly including a first region for receiving a portion of the head rail, plurality of slats and bottom rail of the mini-blind product, and a second region for receiving a portion of the head rail, plurality of slats and bottom rail of a second mini-blind product, the die assembly being movable from a first position for sizing the first mini-blind product and to a second position for sizing the second mini-blind product; and the drive system translating the first blade carrier independent of the second blade carrier for a first distance, and translating the first and second blade carriers for a second distance, when the die assembly is in the first position.

2. A blind cutter for in-store sizing a mini-blind product including a head rail, a plurality of slats, and a bottom rail, the blind cutter comprising:

a framework;

a die assembly coupled to the framework having a region for receiving a portion of each of the head rail, plurality of slats, and bottom rail;

a blade carrier assembly attached to the framework, the blade carrier assembly including a first blade carrier having a first blade member attached thereto, and a second blade carrier having a second blade member attached thereto; and a drive system being connected to the framework and blade carrier assembly to provide linear translation of the first blade carrier independent of the second blade carrier for a pre-determined first distance, and simultaneous linear translation of the first and second blade carriers for a pre-determined second distance.

3. The blind cutter of claim 2, wherein the first blade member includes a first opening for receiving the portion of the bottom rail to be sized, and a front blade portion for cutting the portion of slats to be cut.

4. The blind cutter of claim 2, wherein the first blade carrier includes a third blade, wherein the second blade is configured to size the slats, and the third blade is configured to size the bottom rail.

5. The blind cutter of claim 2 wherein the framework includes a slat shear plate, the first blade carrier being movable independently of the second blade carrier to compress a variable number of slats between the second blade member and the slat shear plate, such that a first of the plurality of slats is in contact with the second blade and the last of the plurality of slats is in contact with the slat shear plate.

6. The blind cutter of claim 2, wherein the die assembly includes a second region for receiving a portion of a second head rail, plurality of slats and bottom rail of a second mini-blind product, the die assembly being movable from a position for cutting the first mini-blind product and to a second position for cutting the second mini-blind product.

7. The blind cutter of claim 6, wherein the die assembly is slidable from a fixed first position to a fixed second position, the first blind product being sized while the die assembly is in the fixed first position, and the second blind product being sized while the die assembly is in the second fixed position.

8. The blind cutter of claim 7, wherein the first region of the die assembly is proximate the first and second blade members when the die assembly is in the first position, and the second region of the die assembly is proximate the first and second blade members when the die assembly is in the second position.

9. The blind cutter of claim 1, wherein the blade carrier assembly includes a latch mechanism for connecting the first and second blade carriers to provide for simultaneous linear translation of the first and second blade carriers throughout the translation of the first blade carrier, when the die assembly is in the second position.

10. The blind cutter of claim 1, wherein the first blade carrier includes a handle.

11. The blind cutter of claim 1, wherein the drive system includes a driving pawl and track;

the drive system including a switch for releasing the driving pawl from the track to permit manual movement of the first blade carrier to the extended position.

12. A blind cutter for in-store sizing a mini-blind product including a head rail, a plurality of slats, and a bottom rail:;

a framework;

a die assembly coupled to the framework, the die assembly including a region for receiving a portion of the head rail, plurality of slats and bottom rail of the mini-blind product;

a first blade carrier including a first blade carrier having a first blade member attached thereto, and a second blade carrier having a second blade member attached thereto; and a drive system being connected to the first blade carrier assembly to provide translation of the first blade carrier independently of the second blade carrier for a first distance and to provide simultaneous translation of the first and second blade carriers for a second distance.

13. The blind cutter of claim 12, wherein the die assembly includes a second region for receiving a portion of a second mini blind product including a head rail, plurality of slats and bottom rail, the second mini blind product having a geometry different than the first mini-blind product, the die assembly being movable from a first position for cutting the first mini-blind product and to a second position for cutting the second mini-blind product; the drive system translating the first blade carrier independent of the second blade carrier for a first distance, and simultaneous linear translation of the first and second blade carriers for a second distance, when the die assembly is in the first position.

14. The blind cutter of claim 13, wherein the drive system translates the first blade carrier and second blade carrier simultaneously, when the die assembly is in the second position.

15. The blind cutter of claim 13, wherein the blade carrier assembly includes at least one connecting rod connecting the first and second blade carriers, the connecting rod being fixedly secured to the second blade carrier and slidably coupled to the first blade carrier, to permit independent translation of the first blade carrier for a predetermined distance when the die assembly is in the first position.

16. The blind cutter of claim 12, wherein the blade carrier assembly includes a catch to couple the first and second blade carriers together for constant simultaneous translation when the die assembly is in the second position.

17. The blind cutter of claim 13 wherein the first blade carrier includes a first blade member, the second region of the die assembly including a head rail die block, a bottom rail die block, and a safety block, the safety block prohibits the die assembly from being moved from the first position to the second position when the first blade carrier is a region that would allow for contact of the cutting surface of the first blade member with the bottom rail die block, such that the first blade member is prevented from being damaged by the bottom rail die block.

18. The blind cutter of claim 12, wherein at least one of the first and second blade carriers includes a blade.

19. The blind cutter of claim 18, wherein at least one of the first and second blade carriers includes an aperture for receiving the bottom rail.

* * * * *

UNITED STATES PATENT AND TRADEMARK OFFICE

CERTIFICATE OF CORRECTION

PATENT NO. : 6,314,851 B2
APPLICATION NO. : 09/321674
DATED : November 13, 2001
INVENTOR(S) : Graves et al.

It is certified that error appears in the above-identified patent and that said Letters Patent is hereby corrected as shown below:

On the Title Page:

Line 63 delete “now abandoned” and insert --now U.S. Patent No. 6,167,789--.

In the Claims:

Claim 9, line 1, delete “claim 1” and insert --claim 2--.
Claim 10, line 1, delete “claim 1” and insert --claim 2--.
Claim 11, line 1, delete “claim 1” and insert --claim 2--.
Claim 16, line 1, delete “claim 12” and insert --claim 13--.

Signed and Sealed this

Nineteenth Day of February, 2008

Jon W. Dudas

JON W. DUDAS
*Director of the United States Patent and Trademark Office*